US012600892B2

(12) United States Patent
Zhang et al.

(10) Patent No.: US 12,600,892 B2
(45) Date of Patent: Apr. 14, 2026

(54) ABRASIVE ARTICLES AND METHODS FOR FORMING SAME

(71) Applicants: SAINT-GOBAIN ABRASIVES, INC., Worcester, MA (US); SAINT-GOBAIN SURFACE SOLUTIONS FRANCE, Conflans-Sainte-Honorine (FR)

(72) Inventors: Daming Zhang, Shanghai (CN); Yumeng Chen, Shanghai (CN); Nilanjan Sarangi, Shrewsbury, MA (US); Amandine Martin, Lyons (FR); Marcin P. Blicharski, Orly (PL); Renaud Fix, Paris (FR); Lu Lu, Shanghai (CN); Zhongya Zhang, Suzhou (CN)

(73) Assignees: SAINT-GOBAIN ABRASIVES, INC., Worcester, MA (US); SAINT-GOBAIN SURFACE SOLUTIONS FRANCE, Conflans-Sainte-Honorine (FR)

( * ) Notice: Subject to any disclaimer, the term of this patent is extended or adjusted under 35 U.S.C. 154(b) by 711 days.

(21) Appl. No.: 17/810,149

(22) Filed: Jun. 30, 2022

(65) Prior Publication Data
US 2023/0018635 A1     Jan. 19, 2023

(30) Foreign Application Priority Data

Jun. 30, 2021     (CN) .......................... 202110740396.3

(51) Int. Cl.
C09K 3/14         (2006.01)
B24B 37/24        (2012.01)

(52) U.S. Cl.
CPC .......... *C09K 3/1409* (2013.01); *B24B 37/245* (2013.01)

(58) Field of Classification Search
CPC .......... B24B 37/245; B24D 3/14; B24D 3/04; B24D 3/02; B24D 2203/00; B24D 5/02;
(Continued)

(56) References Cited

U.S. PATENT DOCUMENTS 5,129,919 A     7/1992   Kalinowski et al.
5,219,806 A     6/1993   Wood
(Continued)

FOREIGN PATENT DOCUMENTS

CN      103930241 A     7/2014
GB        1443638 A     7/1976
(Continued)

OTHER PUBLICATIONS

International Search Report and Written Opinion for PCT/US2022/073314, mailed Oct. 19, 2022, 10 pages.
(Continued)

*Primary Examiner* — Amber R Orlando
*Assistant Examiner* — Sarah Catherine Case
(74) *Attorney, Agent, or Firm* — Abel Schillinger, LLP; Arpan Ghosh

(57) ABSTRACT

An abrasive article can include a body including agglomerated first abrasive particles and unagglomerated second abrasive particles contained in a bond material. The first abrasive particles can include chromium oxide. The second abrasive particles can include elongated abrasive particles. The bond material can include an inorganic material including a vitreous phase.

20 Claims, 8 Drawing Sheets

101 — Forming a mixture including first abrasive particles and a binder

102 — Forming agglomerates of the first abrasive particles and binder

103 — Forming a mixture including the agglomerates, second abrasive particles, and a bond material 104 — Heat treating the mixture including the agglomerates, second abrasive particles, and bond material to form an abrasive body

(58) Field of Classification Search
CPC . B24D 5/14; B24D 3/18; B24D 3/342; B24D 18/0009; C09K 3/1436
See application file for complete search history.

(56) References Cited

U.S. PATENT DOCUMENTS

| | | | |
|---|---|---|---|
| 5,738,696 A | 4/1998 | Wu | |
| 6,679,758 B2 * | 1/2004 | Bright | B24D 18/00 451/28 |
| 7,544,114 B2 | 6/2009 | Orlhac | |
| 7,722,691 B2 | 5/2010 | Orlhac et al. | |
| 8,475,553 B2 | 7/2013 | Orlhac et al. | |
| 10,358,589 B2 * | 7/2019 | Bujnowski | B24D 3/02 |
| 10,500,697 B2 | 12/2019 | Sarangi et al. | |
| 2010/0196700 A1 | 8/2010 | Orlhac et al. | |
| 2011/0100346 A1 | 5/2011 | Boussant-Roux et al. | |
| 2017/0107412 A1 | 4/2017 | Monroe et al. | |
| 2017/0239787 A1 | 8/2017 | Deleuze et al. | |
| 2019/0100683 A1 | 4/2019 | Sarangi et al. | |
| 2019/0210191 A1 | 7/2019 | Sarangi et al. | |
| 2019/0283216 A1 | 9/2019 | Lukowski et al. | |
| 2020/0306927 A1 * | 10/2020 | Tanikella | G06N 20/00 |
| 2021/0147284 A1 | 5/2021 | Zhang et al. | |

FOREIGN PATENT DOCUMENTS

| | | |
|---|---|---|
| WO | 03086703 A1 | 10/2003 |
| WO | 2016161170 A1 | 10/2016 |

OTHER PUBLICATIONS

Technical Data Sheet, Pink/Ruby Aluminum Oxide, GNP Graystar Specialty Materials, Rev. Feb. 2020, www.GNPGraystar.com.

* cited by examiner

101    Forming a mixture including first abrasive
       particles and a binder

102    Forming agglomerates of the first abrasive
       particles and binder

103    Forming a mixture including the
       agglomerates, second abrasive particles, and
       a bond material 104    Heat treating the mixture including the
       agglomerates, second abrasive particles, and
       bond material to form an abrasive body

ABRASIVE ARTICLES AND METHODS FOR FORMING SAME

CROSS-REFERENCE TO RELATED APPLICATIONS

This application claims priority to Chinese Patent Application No. 202110740396.3, entitled "ABRASIVE ARTICLES AND METHODS FOR FORMING SAME," by Daming ZHANG et al., filed Jun. 30, 2021, which is assigned to the current assigned hereof and incorporated herein by reference in its entirety.

FIELD OF THE DISCLOSURE

The following is directed to abrasive article including a blend of abrasive particles contained in a bond material, and particularly, to abrasive article including a blend of abrasive particles including agglomerated first abrasive particles and elongated second abrasive particles contained in the bond material.

DESCRIPTION OF THE RELATED ART

Abrasive articles are used in material removal operations, such as cutting, grinding, or shaping various materials. Fixed abrasive articles include abrasive particles held in a bond material. The bond material can include an organic and/or inorganic material. The industry continues to demand improved abrasive articles.

SUMMARY OF INVENTION

In an embodiment, an abrasive article can include a body including a bond material; agglomerated first abrasive particles, wherein first abrasive particles comprise chromium oxide ($Cr_2O_3$); and elongated second abrasive particles.

In another embodiment, an abrasive article can include a body including a bond material; agglomerated first abrasive particles, wherein first abrasive particles comprise at least 0.3 wt % of chromium oxide ($Cr_2O_3$) for a total weight of the first abrasive particles; and a porosity in a range including at least 30 vol % and at most 85 vol % for a total volume of the body.

BRIEF DESCRIPTION OF THE DRAWINGS

The present disclosure may be better understood, and its numerous features and advantages made apparent to those skilled in the art by referencing the accompanying drawings.

Figure 1:
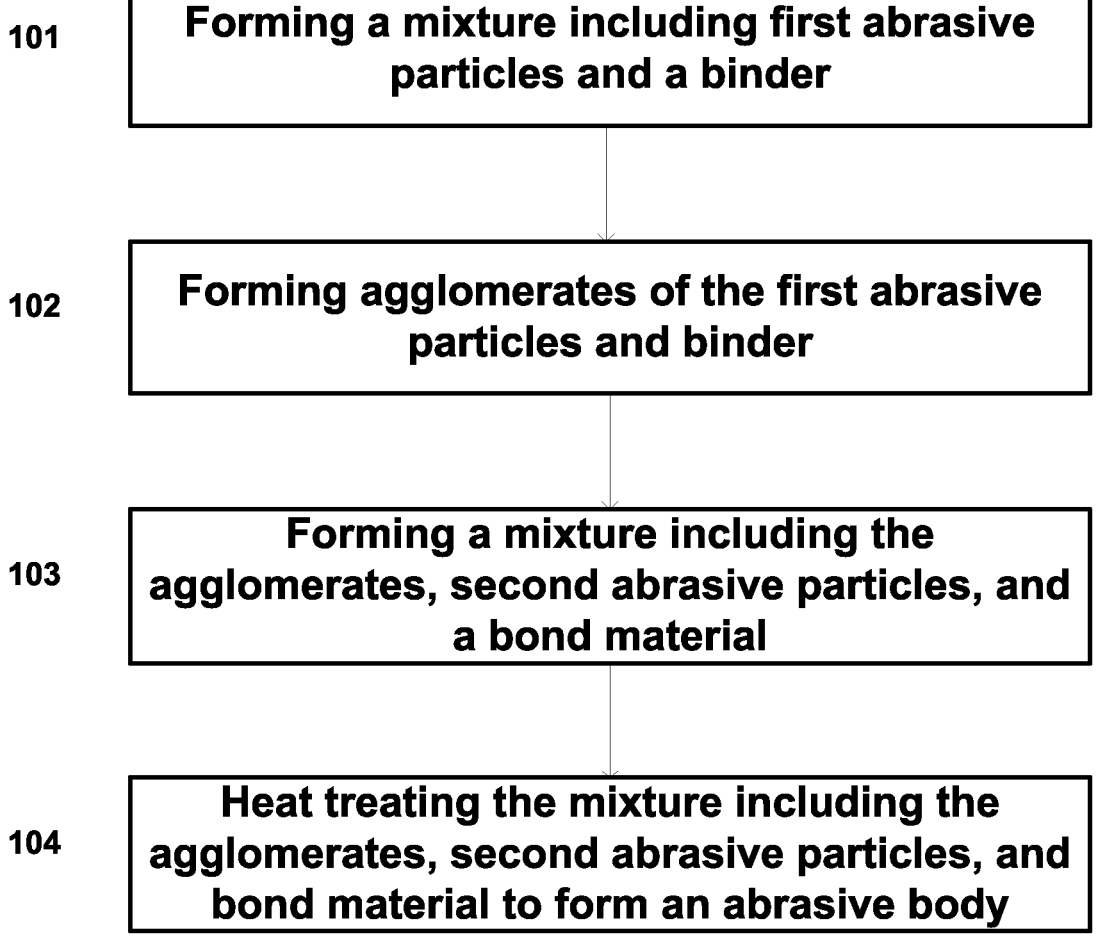
FIG. 1 includes a flowchart illustrating a forming process according to an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having," or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments are directed to abrasive articles including a body including a bond material and a blend of abrasive particles contained in the body. The blend of abrasive particles can include agglomerated first abrasive particles, wherein the first abrasive particles can include chromium oxide, and second abrasive particles. The second abrasive particles can be unagglomerated. In particular embodiments, the second abrasive particles can have an elongated shape. For example, an average length to cross-sectional width ratio of second abrasive particles can be greater than 1:1. In further particular embodiments, the first abrasive particles can include a particular content of chromium oxide ($Cr_2O_3$), such as at least 0.3 wt % for a total weight of the first abrasive particles. The abrasive articles described in embodiments herein can include fixed abrasive articles including, such as, bonded abrasive articles. The abrasive articles can have improved performance and properties, such as power draw, material removal rate, retention profile, and G-Ratio, compared to conventional abrasive articles.

FIG. 1 includes a flowchart illustrating a process of forming an abrasive article in accordance with an embodiment. As illustrated, at step 101, the process can be initiated by forming a mixture including first abrasive particles in a binder.

In accordance with an embodiment, the first abrasive particles can include chromium oxide ($Cr_2O_3$) in a content that can facilitate improved property and performance of the abrasive article. For example, the first abrasive particles can include at least 0.3 wt % of chromium oxide for a total weight of the first abrasive particles, such as at least 0.5 wt %, at least 0.7 wt %, or at least 1 wt %. In a particular embodiment, the first abrasive particles may include chromium oxide ($Cr_2O_3$) in a higher content, which may further facilitate improved grinding performance of abrasive articles. For instance, the abrasive article may include improved profile retention ability, and more particularly, in applications involving medium or high material removal rates. In a further example, the first abrasive particles may include chromium oxide ($Cr_2O_3$) in a content greater than 1 wt %, such as, at least 1.2 wt %, at least 1.3 wt %, at least 1.4 wt %, at least 1.5 wt %, at least 1.8 wt %, at least 2.0 wt %, at least 2.2 wt %, at least 2.4 wt %, or at least 2.5 wt % for a total weight of the first abrasive particles. In another instance, the first abrasive particles can include at most 5.0 wt % of chromium oxide for a total weight of the first abrasive particles, at most 4.5 wt %, at most 4.0 wt %, at most 3.5 wt %, at most 3.0 wt %, at most 2.5 wt %, at most 2.3 wt %, at most 2 wt %, at most 1.9 wt %, at most 1.8 wt %, at most 1.7 wt %, or at most 1.6 wt % of chromium oxide for a total weight of the first abrasive particles. Moreover, in particular examples, the first abrasive particles can include a content of chromium oxide in a range including any of the minimum and maximum percentages noted herein. For example, the content of chromium oxide may in a range including at least 0.5 wt % and at most 5 wt % for a total weight of the first abrasive particles or in a range including at least 1 wt % and at most 3 wt %, or in a range including at least 1.5 wt % to 2.5 wt % for the total weight of the first abrasive particles.

The first abrasive particles can further include aluminum oxide ($Al_2O_3$). More particularly, the first abrasive particles can be aluminum oxide-based material such that a majority content of the first abrasive particles includes aluminum oxide. For example, the abrasive particles can include at least 50 wt % of aluminum oxide for a total weight of the first abrasive particles, such as at least 60 wt %, at least 70 wt %, at least 80 wt %, at least 90 wt %, at least 95 wt %, at least 96 wt %, at least 97 wt %, or at least 98 wt % of aluminum oxide for a total weight of the first abrasive particles. In another example, the first abrasive particle may include at most 99.7 wt % of aluminum oxide for a total weight of the first abrasive particles, such as at most 99.5 wt %, at most 99.2 wt %, at most 99 wt %, at most 98.7 wt %, at most 99.6 wt %, at most 99.4 wt %, at most 99.5 wt %, at most 99.2 wt %, at most 99 wt %, at most 98.7 wt %, at most 98.5 wt %, at most 98.2 wt %, at most 98 wt %, at most 97.8 wt %, at most 97.5 wt %, at most 97.2 wt %, at most 97 wt %, or at most 95 wt % of aluminum oxide for the total weight of the first abrasive particles. In a further example, the content of aluminum in the first abrasive particles can be in a range including any of the minimum and maximum percentages noted herein.

In an embodiment, the first abrasive particles may further include another oxide, such as titanium oxide ($TiO_2$), alkali metal oxide, such as sodium oxide ($Na_2O$), silicon oxide ($SiO_2$), iron oxide ($Fe_2O_3$), or any combination thereof. In a further embodiment, the total content of another oxide may be not greater than 1.6 wt %, such as not greater than 1.3 wt %, not greater than 1.1 wt %, not greater than 0.9 wt %, not greater than 0.7 wt %, not greater than 0.5 wt %, or not greater than 0.4 wt %. Alternatively or additionally, the total content of the other oxides may be at least 0.01 wt %, at least 0.02 wt %, at least 0.04 wt %, at least 0.07 wt %, at least 0.1 wt %, at least 0.2 wt %, or at least 0.3 wt % for the total weight of the first abrasive particles. It can be appreciated the total content of the other oxide may be in a range including any of the minimum and maximum percentages noted herein.

In a further embodiment, the first abrasive particles may be essentially free of any one of titanium oxide ($TiO_2$), alkali metal oxide, silicon oxide ($SiO_2$), and iron oxide ($Fe_2O_3$). For example, the content of any of titanium oxide ($TiO_2$), alkali metal oxide, silicon oxide ($SiO_2$), and iron oxide ($Fe_2O_3$) may be not greater than 0.8 wt %, not greater than 0.5 wt %, not greater than 0.4 wt %, not greater than 0.3 wt %, not greater than 0.1 wt %, not greater than 0.07 wt %, or even not greater than 0.04 wt % for the total weight of the first abrasive particles.

In another example, the first abrasive particles may include sodium oxide ($Na_2O$) of at least 0.01 wt %, at least 0.04 wt %, at least 0.07 wt %, at least 0.1 wt %, at least 0.2 wt %, or at least 0.3 wt %. In another example, the first abrasive particles may sodium oxide ($Na_2O$) of not greater than 0.7 wt % for the total weight of the first abrasive particles, such as not greater than 0.6 wt %, not greater than 0.5 wt %, not greater than 0.4 wt %, or not greater than 0.3 wt % for the total weight of the first abrasive particles. Moreover, the content of sodium oxide ($Na_2O$) may be in a range including any of the minimum and maximum percentages noted herein.

In a further embodiment, the first abrasive particles may include a higher content of chromium oxide ($Cr_2O_3$) than a content of sodium oxide ($Na_2O$). In an example, the first abrasive particles may include a ratio of $Cr_2O_3/Na_2O$. based on weight content, of greater than 1, such as at least 1.3, at least 1.5, at least 1.7, at least 1.9, at least 2.1, at least 2.3, at least 2.5, at least 2.8, at least 3, at least 3.3, at least 3.5, at least 3.7, at least 3.9, at least 4.1, at least 4.5, at least 4.8, at least 5, at least 5.2, at least 5.5, at least 5.8, at least 6, at least 6.3, at least 6.7, or at least 7. In an example, the first abrasive particles may include a ratio of $Cr_2O_3/Na_2O$, based on weight content, of at most 30, at most 25, at most 20, at most 18, at most 15, at most 13, or at most 10. Moreover, the first ratio of $Cr_2O_3/Na_2O$, based on weight content, may be in a range including any of the minimum and maximum values noted herein.

In a further embodiment, the first abrasive particles may have increased toughness comparing to abrasive particles that are made of similar materials but are essentially free of chromium oxide or have a lower content chromium oxide comparing to the first abrasive particles. For example, the first abrasive particles may have greater toughness comparing to white fused alumina, pink fused alumina, or both.

In a further embodiment, the first abrasive particles may be less friable comparing to abrasive particles that are made of similar materials but are essentially free of chromium oxide or have a lower content chromium oxide comparing to the first abrasive particles. For example, the first abrasive particles may have lower friability comparing to white fused alumina, pink fused alumina, or both.

In a further embodiment, the first abrasive particles can include a particular hardness that may facilitate improved performance of the abrasive article. In an aspect, the hardness may include Vickers hardness, Rockwell hardness, or both. In another aspect, the first abrasive particles can include Vickers hardness (HV) of greater than 2135, such as at least 2137, at least 2140, at least 2150, at least 2160, at least 2165, at least 2167, or at least 2169. In another aspect, the first abrasive particles can include Vickers hardness (HV) of not greater than 2200, not greater than 2190, not greater than 21880, not greater than 2175, not greater than 2171, or no greater than 2269. It is to be appreciated that the first abrasive particles can include Vickers hardness in a range including any of the minimum and maximum values noted herein. Vickers hardness can be tested in accordance with ISO 14705:2008.

In a further embodiment, the first abrasive particles can include a particular toughness that may facilitate improved performance of the abrasive article. The toughness may be tested according to ANSI-B74.8 R2007. In an aspect, the first abrasive particles can include a toughness of greater than 38%, such as at least 40% or at least 43% according to ANSI-B74.8 R2007. In a particular aspect, the first abrasive particles may include even higher toughness, such as greater than 43%, at least 44%, at least 45%, at least 46%, at least 47%, or at least 48% ANSI-B74.8 R2007. In a further aspect, the first abrasive particles can include a toughness of not greater than 57%, not greater than 55%, not greater than 53%, not greater than 51%, or not greater than 50% according to ANSI-B74.8 R2007. In a further aspect, the toughness of the first abrasive particles may be in a range including any of the minimum and maximum percentages noted herein.

In an embodiment, the first abrasive particles can include aluminum oxide including alpha-alumina having a particular average crystallite size. In an example, the first abrasive particles can include alpha-alumina having an average crystallite size of at least 0.1 microns, at least 0.12 microns, at least 0.15 microns, at least 0.18 microns, at least 0.2 microns, or at least 0.3 microns. In certain instances, the average crystallite size may be greater than 0.5 microns, such as at least 0.6 microns, at least 0.7 microns, at least 0.9 microns, at least 1 micron, at least 1.2 microns, at least 1.5 microns, or at least 2 microns. In another example, the first abrasive particles can include alpha-alumina having an average crystallite size of at most 10 microns, such as at most 7 microns, at most 5 microns, at most 3 microns, at most 2 microns, at most 1 micron, at most 0.5 microns, or at most 0.2 microns. In another example, the first abrasive particles can include alpha-alumina having an average crystallite size in a range including any of the minimum and maximum values noted herein.

In particular embodiments, the first abrasive particles can include fused alumina. More particularly, the first abrasive particles can include fused alumina particles including chromium oxide. In particular examples, the first abrasive particles can consist of fused alumina abrasive particles including a content of chromium oxide noted in embodiments herein. In a particular implementation, fused alumina abrasive particles including chromium oxide may be utilized as the first abrasive particles, wherein a content of chromium oxide can be at least 0.5 wt % or at least 1 wt % or higher for a total weight of the fused alumina abrasive particles. In another embodiment, the first abrasive particles may include sol-gel alumina, sintered alumina, microcrystalline alumina, nanocrystalline alumina, or a combination thereof.

In an embodiment, the first abrasive particles can have an average particle size that may facilitate formation of improved structure and/or performance of the abrasive article. In an example, the average particle size of the first abrasive particles may be at least 1 micron, such as at least 5 microns, at least 10 microns, at least 20 microns, at least 30 microns, at least 40 microns, at least 50 microns, at least 60 microns, at least 70 microns, or even at least 100 microns. The average particle size D50 of the abrasive particles may be determined by utilizing laser diffraction particle size analysis of at least 1 g of discrete particles. Alternatively, the average particle size D50 may be determined by using tiers of sieves having different mesh sizes. In another example, the first abrasive particles can have an average particle size of at most 5000 microns, such as at most 4000 microns, at most 3000 microns, at most 2000 microns, at most 1000 microns, at most 500 microns, at most 400 microns, at most 300 microns, at most 280 microns, at most 250 microns, at most 220 microns, at most 200 microns, at most 180 microns, at most 170 microns, at most 160 microns, at most 100 microns, at most 90 microns, at most 80 microns, at most 70 microns, or at most 60 microns. It will be appreciated that the first abrasive particles can have an average particle size in a range including any of the minimum and maximum values noted above. The average particle size can be determined by utilizing laser diffraction particle size analysis of at least 1 g of discrete particles.

The binder may include an inorganic material, such as a ceramic material, a vitrified material, or a combination thereof. A vitrified material may include a pre-fired glass ground into a powder (a frit), or a mixture of various raw materials such as clay, feldspar, lime, borax and soda, or a combination of fritted and raw materials. Such materials may fuse and form a liquid glass phase at temperatures ranging from about 500 to about 1400° C. and wet the surface of the first abrasive particles to create bond posts upon cooling, which helps hold the first abrasive particles within a composite structure. In particular examples the binder for forming agglomerated first abrasive particles may have a viscosity of about 345 to 55,300 poise at about 1180° C., a melting temperature of about 800 to about 1300° C., or both.

A particular example of a vitrified binder material can include a composition including $SiO_2$, $B_2O_3$, $Al_2O_3$, alkaline earth oxides and alkali oxides. In a particular implementation, the fired vitrified composition can include 71 wt % $SiO_2$ and $B_2O_3$, 14 wt % $Al_2O_3$, less than 0.5 wt % alkaline earth oxides, and 13 wt % alkali oxides.

A ceramic binder material may include a material such as oxides, carbides, nitrides, borides, or a combination thereof. In general, a ceramic material differs from a glassy or vitrified material in that the ceramic material includes a crystalline phase. In certain examples, a ceramic binder material, particularly an unrefined state, may include one or more glassy phases and crystalline phases. Ceramic materials in a raw state, such as clays, cements, and minerals, may be used. A particular examples of a ceramic material may include silica, sodium silicates, mullite and other alumino silicates, zirconia-mullite, magnesium aluminate, magnesium silicate, zirconium silicates, feldspar and other alkali-alumino-silicates, spinels, calcium aluminate, magnesium aluminate and other alkali aluminates, zirconia, zirconia stabilized with yttria, magnesia, calcia, cerium oxide, titania, or other rare earth additives, talc, iron oxide, aluminum oxide, bohemite, boron oxide, cerium oxide, aluminaoxynitride, boron nitride, silicon nitride, graphite, alkali, alkaline-earth, mixed alkali and alkaline-earth silicates, aluminum silicates, zirconium silicates, hydrated silicates, aluminates, oxides, nitrides, oxynitrides, carbides, oxycarbides, derivatives thereof, or any combination thereof.

Binder materials that cure at relatively lower temperatures (i.e., from 120 to 500° C.) may be used. Such binder materials may include organic materials, such as bond materials used to form bonded abrasives and coated abrasives, metal bond materials, other inorganic materials, or any combination thereof.

A liquid vehicle may be added to powder binder materials to facilitate formation of a uniform, homogeneous dispersion of the binder and first abrasive particles. Organic binders, such as dextrin, starch, animal protein glue, other types of glue; a liquid component, such as water, solvent, viscosity, or pH modifiers; and/or mixing aids may be used to facilitate the process of forming agglomerates of the first abrasive particles.

An inorganic adhesion promoter may be added to the mixture to improve adhesion of the binder materials to the abrasive particles as needed to improve the mix quality. An inorganic adhesion promoter may be used with or without an organic binder.

The mixture including the binder and the abrasive particles may optionally include one or more filler materials. The filler material can be distinct from the abrasive particles and may have a hardness less than a hardness of the abrasive particles. The filler material may provide improved mechanical properties and facilitate formation of the abrasive agglomerates according to the embodiments. In at least one embodiment, the filler material can include various materials, such as fibers, woven materials, non-woven materials, particles, minerals, nuts, shells, oxides, alumina, carbide, nitrides, borides, organic materials, polymeric materials, naturally occurring materials, and a combination thereof. In particular instances, the filler material can include a material such as wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), cryolite, glass, glass fibers, titanates (e.g., potassium titanate fibers), rock wool, clay, sepiolite, an iron sulfide (e.g., $Fe_2S_3$, $FeS_2$, or a combination thereof), fluorspar ($CaF_2$), potassium sulfate ($K_2SO_4$), graphite, potassium fluoroborate ($KBF_4$), potassium aluminum fluoride ($KAlF_4$), zinc sulfide (ZnS), zinc borate, borax, boric acid, fine alundum powders, P15A, bubbled alumina, cork, glass spheres, silver, Saran™ resin, paradichlorobenzene, oxalic acid, alkali halides, organic halides, and attapulgite.

Formation of the mixture can include forming a dry or wet mixture. It may be suitable to create a wet mixture to facilitate suitable dispersion of the abrasive particles within the binder.

Moreover, it will be appreciated that the mixture can include other materials, including for example a filler, additives, organic binders, and any other materials known in the art to facilitate formation of a mixture to create a green product prior to formation of a vitrified bonded abrasive. In at least one embodiment, the mixture is essentially free of a pore former.

Referring to FIG. 1, after forming a mixture including abrasive particles and binder at step 101, the process can continue at step 102 by forming agglomerates of the abrasive particles and binder. As used herein reference to an agglomerate is reference to a particle including smaller particles (e.g., abrasive particles) contained within a binder material that may be a substantially uniform and continuous three-dimensional phase of material extending throughout the volume of the agglomerate. The binder material may include a certain content of a vitreous phase. An agglomerate may be distinct from an aggregate, which is a composite of various sizes of discrete particles bonded to each other in the form of a particulate mass. Notably, an aggregate does not include a continuous binder extending throughout the volume of the particulate mass.

The process of forming the abrasive agglomerates can include heating at least a portion of the binder material, which may include converting at least a portion of the binder to a liquid phase during heat treatment such that it is sufficient to bond the plurality of abrasive particles together to form the abrasive agglomerates. More particularly, the process of forming abrasive agglomerates can include heating the mixture to a forming temperature from 120° C. to 1800° C. The forming temperature, depending on the binder material, can include the curing temperatures, fusing temperatures, the melting temperatures, or any combinations thereof of the binder materials. A skilled artisan will appreciate reference to forming temperature can be a suitable temperature for having the binder material form a liquid phase, which can facilitate the formation of the abrasive agglomerates.

Agglomerates of abrasive particles may be formed into numerous sizes and shapes using a variety of techniques. These techniques may be carried out before, during or after heating the initial mixture of the first abrasive particles and binder material. Some known methods may be used to prepare the abrasive agglomerates. For example, methods disclosed in U.S. Pat. No. 5,738,696 B2, U.S. Pat. No. 6,679,758 B2 and U.S. Pat. No. 6,988,937 may be used, all of which patents are incorporated in their entireties by reference.

In an embodiment, the agglomerates of the first abrasive particles may be sintered. In an exemplary forming process, forming the abrasive agglomerates may include the following: i) feeding the abrasive particles and binder material into a rotary calcination kiln at a controlled feed rate; ii) rotating the kiln at a controlled speed; iii) heating the mixture at a heating rate determined by the feed rate and the speed of the kiln to a temperature in a range from about 80° C. to 1300° C.; iv) tumbling the first abrasive particles and the binder material in the kiln until the binder material adheres to the abrasive particles and a plurality of abrasive particles adhere together to form the sintered agglomerated abrasive particles; and v) recovering the sintered agglomerated abrasive particles from the kiln. In particular embodiments, the sintered agglomerated abrasive particles can have a loose packing density of at most 1.6 g/cc.

In another exemplary process, the initial mixture of abrasive particles and binder material may be agglomerated before firing the mixture. The pre-fired agglomerates may be a relatively weak mechanical structure and may be further treated to form the sintered agglomerates. A pre-fired agglomerate is also referred to as "green agglomerate". Green agglomerates may be fed into a rotary calcination apparatus for sintering or heated in an oven without tumbling, in a continuous or batch process. Green agglomerates may be screened for agglomerate sizes before heated in an oven or calcination apparatus.

Abrasive particles and binder materials may be agglomerated, prior to heat treatment, by a number of techniques. For example, abrasive particles may be conveyed into a fluidized bed and then wetted with a liquid containing the binder material to adhere the binder material to abrasive particles. Pan pelletizing may be carried out by adding particles to a mixer bowl and metering a liquid component containing the binder material (e.g., water or organic binder and water) onto abrasive particles, with mixing, to agglomerate them together. Alternatively, a liquid dispersion of the binder material, optionally with an organic binder, may be sprayed onto abrasive particles, and then coated abrasive particles may be mixed to form agglomerates.

A low-pressure extrusion apparatus may be used to extrude a paste of abrasive particles and binder material into sizes and shapes which can be dried to form agglomerates. A paste may be made of the binder materials and abrasive particles with an organic binder solution, and extruded into a desired shape, e.g., filamentary particles. In a dry granulation process, a sheet or block made of abrasive particles imbedded in dispersion or paste of the binding material may be dried and then a roll compactor can be used to break the composite of grain and binding material. In another method of making green or precursor agglomerates, the mixture of the binder material and abrasive particles can be added to a molding device and the mixture molded to form precise shapes and sizes.

In a further exemplary process, a simple mixture, or preferably a substantially homogeneous mixture, of the abrasive particles and binder material (optionally with an organic binder) can be fed into a rotary calcination apparatus. Exemplary rotary calcination apparatus disclosed in U.S. Pat. No. 6,679,758 may be used, which patent is incorporated herein in its entirety by reference. The mixture is tumbled at a predetermined rpm and along a predetermined incline, with the application of heat. Agglomerates can be formed as the binder material mixture heats, melts, flows and adheres to abrasive particles. The heating and agglomeration can be carried out simultaneously at controlled rates and volumes of feeding and heat application. The feed rate generally is set to yield a flow occupying roughly 8-12%, by volume, of the tube (i.e., the kiln portion) of the rotary calcination apparatus. The maximum temperature exposure within the apparatus is selected to keep the viscosity of the binder materials in a liquid state at a viscosity of at least about 1,000 poise. This can help avoid excessive flow of the binder material onto the surface of the tube and loss of binder material from the surfaces of abrasive particles. The agglomeration process for agglomerating and firing the agglomerates can be carried out in a single process step or in two separate steps, preferably, in a single process step.

Suitable rotary calcination machines may be obtained from Harper International, Buffalo, N.Y., or from Alstom Power, Inc., Applied Test Systems, Inc., and other equipment manufacturers. The apparatus optionally may be fitted with electronic, in-process control and detection devices, a cooling system, various designs of feed apparatus and other optional devices.

When agglomerating abrasive particles with lower temperature curing (e.g., from about 80 to 500° C.) binder materials, a rotary kiln apparatus equipped with a rotary dryer can be used. The rotary dryer supplies heated air to the discharge end of the tube to heat the abrasive particle mixture, thereby curing the binder material and bonding it to abrasive particles, and to thereby agglomerate the abrasive particles as it is collected from the apparatus. As used herein, the term "rotary calcination kiln" is exemplified by such rotary dryer devices.

In a further exemplary process for making agglomerates, a mixture of abrasive particles, binder materials, and an organic binder system may be fed into an oven, without pre-agglomeration, and heated. The mixture may be heated to a temperature high enough to cause binder materials to melt, flow and adhere to abrasive particles, then cooled to make a composite. The composite can be crushed and screened to make the sintered agglomerates.

In another embodiment, the agglomerates of the first abrasive particles may not be sintered before being included in an abrasive body, rather the "green" agglomerates are molded with bond materials to form a green abrasive body that is then treated to form the finally formed abrasive body, e.g., a bonded abrasive body. In an exemplary method of carrying out this process, a vitrified binder material having high viscosity (when melted into a liquid) may be used to agglomerate abrasive particles. The green agglomerates may be oven-dried and used to form a green abrasive body. The green abrasive body may be heated at a temperature that is effective to fuse, but to avoid flow of, the vitrified binder material. The heating temperature can be selected to be sufficiently high to cause the binder materials to fuse into a glass to agglomerate the abrasive particles. The heating temperature may also be high enough to cause the bond material within the green abrasive body to flow, which may facilitate formation of the bonded abrasive body. The bond material may have a lower viscosity than the binder material when melted, but it is not essential to select the binder and bond materials with different fusing or melting temperatures to carry out this process.

In an embodiment, the binder material can be present in the agglomerates in a particular content to facilitate formation of agglomerates of the first abrasive particles. For example, the binder material can be in a content in a range from 0.5 vol % to 15 vol %, or in a range from 1 vol % to 10 vol %, or even in a range from 2 vol % to 8 vol % of the total volume of the agglomerates of the first abrasive particles. In a further embodiment, the agglomerates of the first abrasive particles may include porosity within the agglomerates. The porosity may range from 30 vol % to about 88 vol %, or from 40 vol % to about 80 vol %, or 30 vol % to 60 vol %, or even from 50 vol % to 75 vol % of the total volume of the agglomerates. At least a portion of the porosity, such as up to 75 vol % of the porosity, within the agglomerates may include interconnected porosity (also referred to as open porosity in this disclosure), or porosity permeable to the flow of fluids, including liquids (e.g., grinding coolant and swarf) and air. In a further embodiment, the agglomerates may include the first abrasive particles in a content in a range from 10 vol % to 65 vol %, in a range from 35 vol % to 55 vol %, or in a range from 40 vol % to 52 vol % of the total volume of the agglomerates.

In another embodiment, the agglomerates of the first abrasive particles may have a certain density. The density of agglomerates may be expressed in a number of ways. The bulk density of agglomerates can be expressed as the loose pack density (LPD). The relative density of agglomerates can be expressed as a percentage of initial relative density, or as a ratio of the relative density of the agglomerates to the components used to make the agglomerates, taking into consideration the volume of interconnected porosity in the agglomerates.

The initial average relative density, expressed as a percentage, can be calculated by dividing the LPD by a theoretical density of the agglomerates assuming zero porosity. The theoretical density can be calculated according to the volumetric rule-of-mixture method from the weight percentage and specific gravity of the binder and of the first abrasive particles contained in the agglomerates. In particular examples, a maximum percent relative density of the agglomerates of the first abrasive particles may be 50 vol % or 30 vol %.

The relative density may be measured by a fluid displacement volume technique to include interconnected porosity and exclude closed cell porosity. The relative density can be the ratio of the volume of the agglomerates measured by fluid displacement to the volume of the materials used to make the agglomerates. The volume of the materials used to make the agglomerates can be a measure of the apparent volume based on the quantities and packing densities of the abrasive particles and binder material used to make the agglomerates. In a particular embodiment, a maximum relative density of the agglomerates of the first abrasive particles may be 0.7 or 0.5.

In an embodiment, the agglomerates of the first abrasive particles may have a particular average particle size (D50) that may facilitate formation of the abrasive article with improved structure and/or performance. In an example, the average particle size of the agglomerates can be at least 50 microns, at least 60 microns, at least 70 microns, at least 80 microns, at least 90 microns, at least 100 microns, at least 110 microns, at least 120 microns, at least 130 microns, at least 140 microns, at least 150 microns, at least 200 microns, at least 300 microns, at least 400 microns, at least 500 microns, or even at least 600 microns. Still, in another example, the agglomerates can have an average particle size of at most 5000 microns, such as at most 4000 microns, at most 3000 microns, at most 2000 microns, at most 1500 microns, at most 1000 microns, or at most 900 microns. It will be appreciated that the agglomerates of the first abrasive particles can have an average particle size within a range including any of the minimum and maximum values noted above. The average sizes of agglomerates may be determined by using sieves with different mesh sizes. For examples, agglomerates may be sieved using 8 tiers of sieves, and mesh sizes can be selected based on average particle sizes of first abrasive particles. For example, mesh sizes can be 25, 30, 35, 45, 50, 60, and 70 for agglomerates made of abrasive particles of grit 80, and agglomerates made of abrasive particles of grit 100 may be sieved using mesh sizes of 35, 45, 50, 60, 70, 80, and 100.

Referring again to FIG. 1, after forming the agglomerates of the first abrasive particles and binders at step 102, the process can continue at step 103, which can include forming a mixture including the abrasive agglomerates, second abrasive particles, and a bond material. In an embodiment, the bond material can have a composition that is distinct from the binder materials. The bond material may also be referred to as a precursor bond material, which can be in the form of a powder material until it is heat treated and forms the finally-formed bond material of the abrasive article. More particularly, the bond material can include an oxide-based composition, which may include some content one or more of silica, boron oxide, alumina, zircon, sodium oxide, potassium oxide, iron oxide, titanium oxide, magnesium oxide, calcium oxide, and the like. The composition of the precursor bond material is used to form the bond material of the finally-formed bonded abrasive body. Contents of the bond material of the finally-formed bonded abrasive body are disclosed in more details hereinafter. The composition of the bond precursor material and the bond material of the finally-formed bonded abrasive body can be substantially the same (i.e., 10% or less difference in any one of the components between the precursor bond material and bond material of the finally-formed bonded abrasive body) or essentially the same (i.e., 5% or less difference in any one of the components between the precursor bond material and bond material of the finally-formed bonded abrasive body).

The second abrasive particles are unagglomerated abrasive grains. In an embodiment, the second abrasive particles can be elongated. In an example, the second abrasive particles may include abrasive particles having the shape of extruded rods, abrasive particles having a filamentary shape, or any combination thereof.

Figure 2:
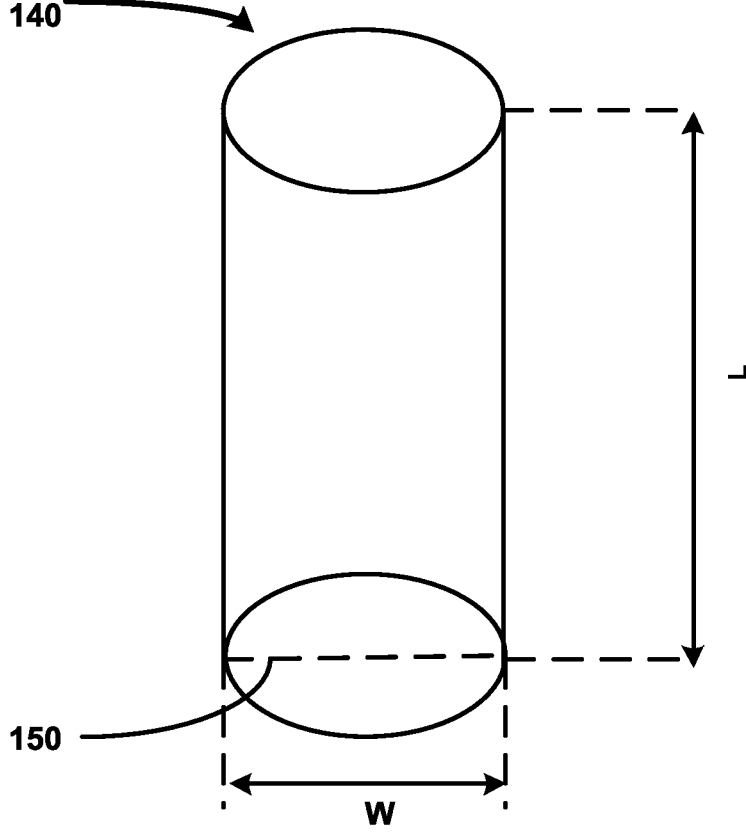
FIG. 2 includes an illustration of an exemplary abrasive particle.

In another embodiment, the second abrasive particles can have a particular average aspect ratio of length to cross-sectional width that can facilitate improved formation, structure and/or performance of the abrasive article. It is to be appreciated cross-sectional width can include diameter. Referring to FIG. 2, an exemplary second abrasive particle 140 is illustrated including a cross-sectional width or diameter W 150 and a length L. In an aspect, the average aspect ratio of length to cross-sectional width can be greater than 1, such as at least 1.5, at least 2, at least 2.3, at least 2.5, at least 2.8, at least 3, at least 4, at least 5, at least 6, at least 7, or at least 8. In another aspect, the average aspect ratio can be at most 30, at most 20, at most 15, at most 12, at most 10, at most 9, at most 8, at most 7, at most 6, at most 5, at most 4, or at most 3. Moreover, the second abrasive particles can have an aspect ratio of length to cross-sectional width in a range including any of the minimum and maximum values noted herein.

In an embodiment, the second abrasive particles can include a particular average cross-sectional width that can facilitate improved formation, structure, and/or performance of the abrasive article. In an aspect, the second abrasive particles can have an average cross-sectional width of at least 5 microns, such as at least 10 microns, at least 20 microns, at least 30 microns, at least 40 microns, at least 50 microns, at least 60 microns, at least 70 microns, at least 80 microns, at least 90 microns, at least 100 microns, at least 110 microns, at least 120 microns, at least 130 microns, at least 140 microns, at least 150 microns, at least 160 microns, at least 180 microns, or at least 200 microns. Average cross-sectional width of the elongated second abrasive particles may be determined by using tiers of sieves to sieve the particles.

In another aspect, the second abrasive particles can include the average cross-sectional width of at most 2000 microns, such as at most 1800 microns, at most 1500 microns, at most 1200 microns, at most 1100 microns, at most 1000 microns, at most 900 microns, at most 800 microns, at most 700 microns, at most 500 microns, at most 400 microns, at most 350 microns, at most 290 microns, at most 280 microns, at most 275 microns, at most 260 microns, at most 250 microns, at most 240 microns, at most 230 microns, at most 220 microns, at most 210 microns, at most 200 microns, at most 190 microns, at most 180 microns, at most 170 microns, at most 165 microns, at most 160 microns, at most 150 microns, at most 140 microns, at most 130 microns, at most 120 microns, at most 110 microns, at most 100 microns, at most 90 microns, at most 80 microns, at most 70 microns, at most 60 microns, or at most 50 microns. Moreover, the average cross-sectional width of the second abrasive particles can be in a range including any of the minimum and maximum values noted above. For instance, the average cross-sectional width of the second abrasive particles can be in a range including at least 20 microns and at most 2000 microns or in a range including at least 100 microns and at most 1200 microns.

In a further embodiment, the second abrasive particles can include a material including an oxide material. In particular, the second abrasive particles can include an alumina-based material. For example, the second abrasive particles may include a material including sol-gel alumina, sintered alumina, fused alumina, microcrystalline alumina, nanocrystalline alumina, or any combination thereof. In an exemplary application, the second abrasive particles may include sintered alumina particles. In another exemplary application, the second abrasive particles may consist essentially of sol-gel alumina particles.

In another example, the second abrasive particles may include at least 50 wt % of alumina for a total weight of the second elongated abrasive particles, such as at least 60 wt %, at least 70 wt %, at least 80 wt %, at least 90 wt %, at least 95 wt %, at least 96 wt %, at least 97 wt %, or at least 98 wt % of alumina for the total weight of the elongated second abrasive particles. In still another example, the second abrasive particles can include at most 99.9 wt % of alumina for the total weight of the abrasive particles, such as at most 99.5%, at most 99 wt %, or at most 98.5 wt % for the total weight of the abrasive particles. Moreover, the second abrasive particles can include alumina in a content including any of the minimum and maximum percentages noted herein.

In an embodiment, the second abrasive particles can include alpha-alumina having a particular average crystallite size. In an example, the second abrasive particles can include alpha-alumina having an average crystallite size of at least 0.1 microns, at least 0.12 microns, at least 0.15 microns, or at least 0.17 microns. In another example, the second abrasive particles can include alpha-alumina having an average crystallite size of at most 0.5 microns, such as at most 0.4 microns, at most 0.3 microns, or at most 0.2 microns. In another example, the second abrasive particles can include alpha-alumina having an average crystallite size in a range including any of the minimum and maximum values noted herein.

In still another example, the second abrasive particles may include another oxide including alkaline earth, rare earth, a transition metal, or any combination thereof. A particular example of an oxide other than alumina may include magnesia (MgO), zirconia($ZrO_2$), titania ($TiO_2$), or any combination thereof. A total content of oxides other than alumina may be less than 50 wt % of the total weight of the second abrasive particles, such as at most 30 wt %, at most 20 wt %, at most 10 wt %, at most 5 wt %, at most 3 wt %, at most 1 wt %, or at most 0.5 wt %.

In an embodiment, the mixture may include unagglomerated abrasive particles including third abrasive particles different than the second abrasive particles. In an example, the third abrasive particles may include shaped abrasive particles, non-shaped abrasive particles, or any combination thereof. In an example, the third abrasive particles may include a material including an oxide, carbide, nitride, boride, oxycarbide, oxynitrides, silicate, oxyboride, superabrasives, minerals, or any combination thereof. Exemplary third abrasive particles may include silicon dioxide, silicon carbide, alumina, zirconia, rare earth-containing materials, cerium oxide, sol-gel derived particles, iron oxide, gypsum, glass-containing particles, and a combination thereof. In particular examples, the third abrasive particles may include alumina, such as fused alumina, sol-gel alumina, sintered alumina, microcrystalline alumina, nanocrystalline alumina, sintered alumina with additives, shaped and sintered aluminum oxide, pink alumina, ruby alumina, electrofused monocrystalline alumina, alumina zirconia, extruded bauxite, extruded alumina, or any combination thereof. In a more particular example, the third abrasive particles may include fused alumina. In another particular example, the third abrasive particles may include chromium oxide in addition to alumina. In still another particular example, the third abrasive particles may include the same material as the first abrasive particles.

The third abrasive particles may include a particular average particle size that may facilitate improved formation, structure, and/or performance of the abrasive article. In an aspect, the average particle size of the third abrasive particles can be at most 1.9 mm, at most 1.8 mm, at most 1.6 mm, at most 1.5 mm, at most 1.2 mm, at most 1 mm, at most 900 microns, at most 850 microns, at most 830 microns, at most 800 microns, at most 750 microns, at most 700 microns, at most 650 microns, at most 600 microns, at most 550 microns, at most 500 microns, at most 450 microns, at most 400 microns, at most 380 microns, at most 350 microns, at most 320 microns, at most 300 microns, at most 280 microns, at most 260 microns, or at most 255 microns. In another aspect, the average particle size of the third abrasive particles can be at least 80 microns, such as at least 100 microns, at least 120 microns, at least 140 microns, at least 150 microns, at least 170 microns, at least 180 microns, at least 200 microns, at least 210 microns, at least 230 microns, or at least 250 microns. Moreover, the average particle size of the third abrasive particles can be in a range including any of the minimum and maximum values noted herein.

In a particular embodiment, the mixture can include shaped abrasive particles. The shaped abrasive particles can have various shapes. In general, the shaped abrasive particles may have a shape approximating shaping components used in the forming process. For example, a shaped abrasive particle may have a predetermined two-dimensional shape as viewed in any two dimensions of the three dimension shape, and particularly in a dimension defined by the length and width of the particle. Some exemplary two-dimensional shapes can include a polygon, an ellipsoid, a numeral, a Greek alphabet letter, a Latin alphabet letter, a Russian alphabet character, a Kanji character, a complex shape including a combination of polygonal shapes, and a combination thereof. In particular instances, the shaped abrasive particle may have two-dimensional polygonal shape such as, a triangle, a rectangle, a quadrilateral, a pentagon, a hexagon, a heptagon, an octagon, a nonagon, a decagon, and a combination thereof.

Figure 6A:
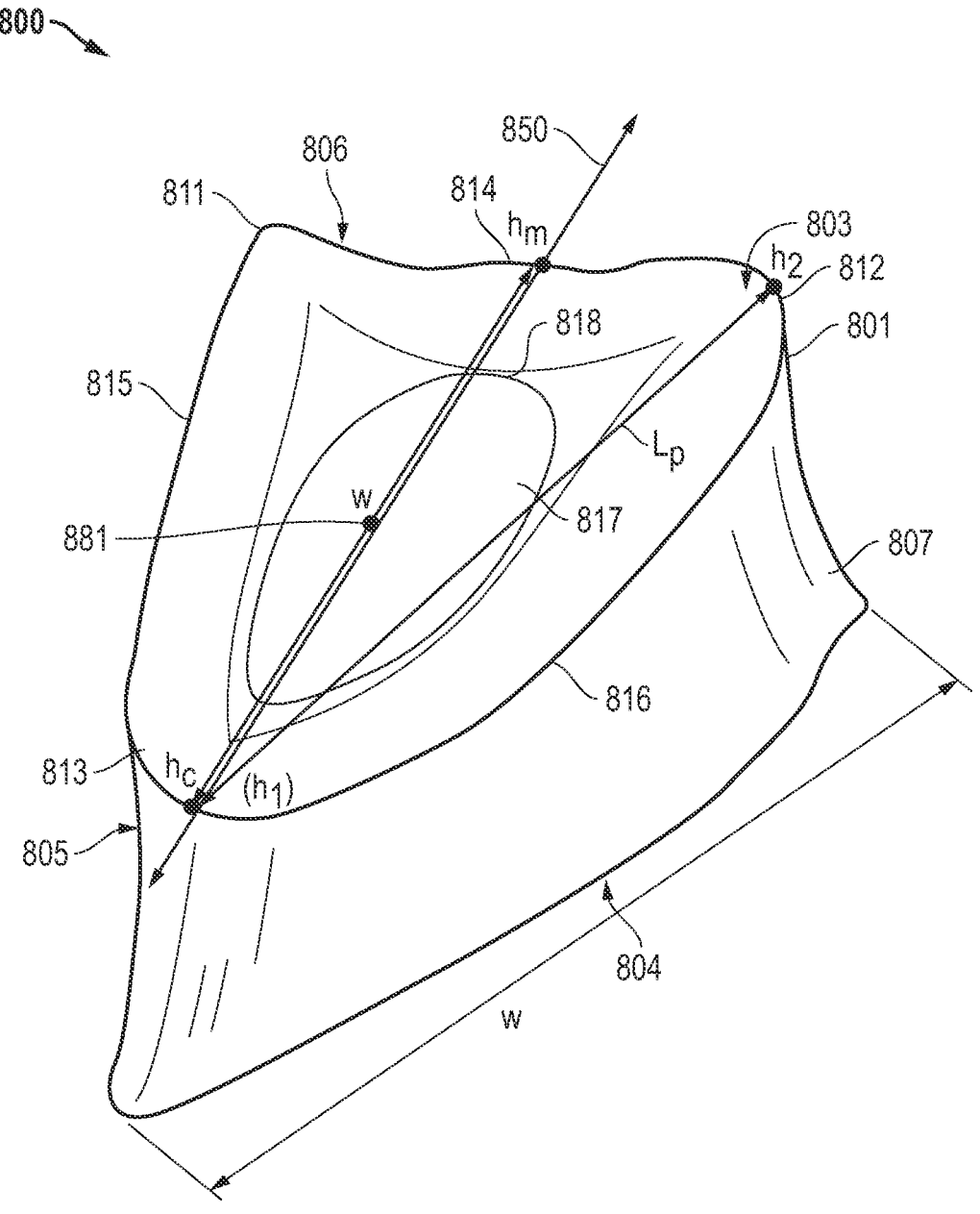
FIG. 6A includes a perspective view illustration of a shaped abrasive particle in accordance with an embodiment.
Figure 6B:
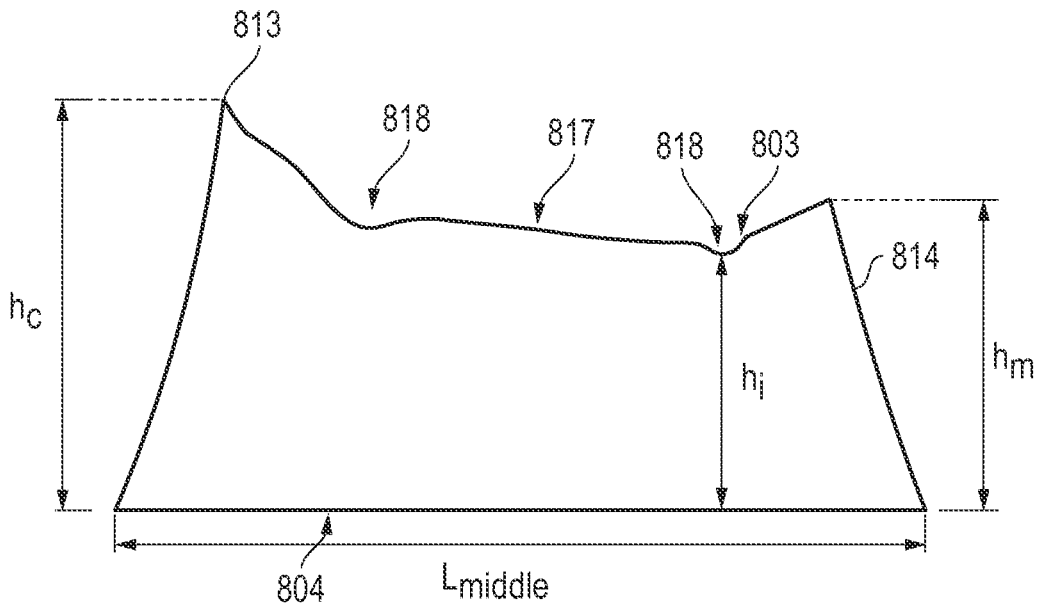
FIG. 6B includes a cross-sectional illustration of the shaped abrasive particle of FIG. 6A.

In one particular aspect, the shaped abrasive particles may be formed to have a shape as illustrated in FIG. 6A. FIG. 6A includes a perspective view illustration of a shaped abrasive particle in accordance with an embodiment. Additionally, FIG. 6B includes a cross-sectional illustration of the shaped abrasive particle of FIG. 6A. The body 801 includes an upper surface 803 a bottom surface 804 opposite the upper surface 803. The upper surface 803 and the bottom surface 804 can be separated from each other by side surfaces 805, 806, and 807. As illustrated, the body 801 of the shaped abrasive particle 800 can have a generally triangular shape as viewed in a plane defined by the upper surface 803. In particular, the body 801 can have a length (Lmiddle) as shown in FIG. 6B, which may be measured at the bottom surface 804 of the body 801 and extending from a corner at the bottom surface corresponding to corner 813 at the top surface through a midpoint 881 of the body 801 to a midpoint at the opposite edge of the body corresponding to the edge 814 at the upper surface of the body. Alternatively, the body can be defined by a second length or profile length (Lp), which is the measure of the dimension of the body from a side view at the upper surface 803 from a first corner 813 to an adjacent corner 812. Notably, the dimension of Lmiddle can be a length defining a distance between a height at a corner (hc) and a height at a midpoint edge (hm) opposite the corner. The dimension Lp can be a profile length along a side of the particle defining the distance between h1 and h2 (as explained herein). Reference herein to the length can be reference to either Lmiddle or Lp.

The body 801 can further include a width (w) that is the longest dimension of the body and extending along a side. The shaped abrasive particle can further include a height (h), which may be a dimension of the shaped abrasive particle extending in a direction perpendicular to the length and width in a direction defined by a side surface of the body 801. Notably, as will be described in more detail herein, the body 801 can be defined by various heights depending upon the location on the body. In specific instances, the width can be greater than or equal to the length, the length can be greater than or equal to the height, and the width can be greater than or equal to the height.

Moreover, reference herein to any dimensional characteristic (e.g., h1, h2, hi, w, Lmiddle, Lp, and the like) can be reference to a dimension of a single particle of a batch. Alternatively, any reference to any of the dimensional characteristics can refer to a median value or an average value derived from analysis of a suitable sampling of particles from a batch. Unless stated explicitly, reference herein to a dimensional characteristic can be considered reference to a median value that is a based on a statistically significant value derived from a sample size of suitable number of particles of a batch. Notably, for certain embodiments herein, the sample size can include at least 40 randomly selected particles from a batch of particles. A batch of particles may be a group of particles that are collected from a single process run, and more particularly, may include an amount of shaped abrasive particles suitable for forming a commercial grade abrasive product, such as at least about 20 lbs. of particles.

In accordance with an embodiment, the body 801 of the shaped abrasive particle can have a first corner height (hc) at a first region of the body defined by a corner 813. Notably, the corner 813 may represent the point of greatest height on the body 801, however, the height at the corner 813 does not necessarily represent the point of greatest height on the body 801. The corner 813 can be defined as a point or region on the body 801 defined by the joining of the upper surface 803, and two side surfaces 805 and 807. The body 801 may further include other corners, spaced apart from each other, including for example, corner 811 and corner 812. As further illustrated, the body 801 can include edges 814, 815, and 816 that can separated from each other by the corners 811, 812, and 813. The edge 814 can be defined by an intersection of the upper surface 803 with the side surface 806. The edge 815 can be defined by an intersection of the upper surface 803 and side surface 805 between corners 811 and 813. The edge 816 can be defined by an intersection of the upper surface 803 and side surface 807 between corners 812 and 813.

As further illustrated, the body 801 can include a second midpoint height (hm) at a second end of the body 801, which can be defined by a region at the midpoint of the edge 814, which can be opposite the first end defined by the corner 813. The axis 850 can extend between the two ends of the body 801. FIG. 6B is a cross-sectional illustration of the body 801 along the axis 850, which can extend through a midpoint 881 of the body 801 along the dimension of length (Lmiddle) between the corner 813 and the midpoint of the edge 814.

In accordance with an embodiment, the shaped abrasive particles of the embodiments herein, including for example, the particle of FIGS. 6A and 6B can have an average difference in height, which is a measure of the difference between hc and hm. For convention herein, average difference in height will be generally identified as hc-hm, however it is defined an absolute value of the difference and it will be appreciated that average difference in height may be calculated as hm-hc when the height of the body 801 at the midpoint of the edge 814 is greater than the height at the corner 813. More particularly, the average difference in height can be calculated based upon a plurality of shaped abrasive particles from a suitable sample size, such as at least 40 particles from a batch as defined herein. The heights hc and hm of the particles can be measured using a STIL (Sciences et Techniques Industrielles de la Lumiere-France) Micro Measure 3D Surface Profilometer (white light (LED) chromatic aberration technique) and the average difference in height can be calculated based on the average values of hc and hm from the sample.

As illustrated in FIG. 8B, in one particular embodiment, the body 801 of the shaped abrasive particle may have an average difference in height at different locations at the body. The body can have an average difference in height, which can be the absolute value of [hc-hm] between the first corner height (hc) and the second midpoint height (hm) is at least about 20 microns. It will be appreciated that average difference in height may be calculated as hm-hc when the height of the body 801 at a midpoint of the edge is greater than the height at an opposite corner. In other instances, the average difference in height [hc-hm], can be at least about 25 microns, at least about 30 microns, at least about 36 microns, at least about 40 microns, at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above.

Moreover, it will be appreciated that the average difference in height can be based upon an average value of hc. For example, the average height of the body at the corners (Ahc) can be calculated by measuring the height of the body at all corners and averaging the values, and may be distinct from a single value of height at one corner (hc). Accordingly, the average difference in height may be given by the absolute value of the equation [Ahc-hi], wherein hi is the interior height which can be the smallest dimension of height of the body as measured along a dimension between any corner and opposite midpoint edge on the body. Furthermore, it will be appreciated that the average difference in height can be calculated using a median interior height (Mhi) calculated from a suitable sample size of a batch of shaped abrasive particles and an average height at the corners for all particles in the sample size. Accordingly, the average difference in height may be given by the absolute value of the equation [Ahc-Mhi].

In particular instances, the body 801 can be formed to have a primary aspect ratio, which is a ratio expressed as width:length, wherein the length may be Lmidddle, having a value of at least 1:1. In other instances, the body can be formed such that the primary aspect ratio (w:l) is at least about 1.5:1, such as at least about 2:1, at least about 4:1, or even at least about 5:1. Still, in other instances, the abrasive particle can be formed such that the body has a primary aspect ratio that is not greater than about 10:1, such as not greater than 9:1, not greater than about 8:1, or even not greater than about 5:1. It will be appreciated that the body 801 can have a primary aspect ratio within a range between any of the ratios noted above. Furthermore, it will be appreciated that reference herein to a height is the maximum height measurable of the abrasive particle. It will be described later that the abrasive particle may have different heights at different positions within the body 801.

In addition to the primary aspect ratio, the abrasive particle can be formed such that the body 801 comprises a secondary aspect ratio, which can be defined as a ratio of length:height, wherein the length may be Lmiddle and the height is an interior height (hi). In certain instances, the secondary aspect ratio can be within a range between about 5:1 and about 1:3, such as between about 4:1 and about 1:2, or even between about 3:1 and about 1:2. It will be appreciated that the same ratio may be measured using median values (e.g., median length and interior median height) for a batch of particles.

In accordance with another embodiment, the abrasive particle can be formed such that the body 801 comprises a tertiary aspect ratio, defined by the ratio width:height, wherein the height is an interior height (hi). The tertiary aspect ratio of the body 801 can be within a range between about 10:1 and about 1.5:1, such as between 8:1 and about 1.5:1, such as between about 6:1 and about 1.5:1, or even between about 4:1 and about 1.5:1. It will be appreciated that the same ratio may be measured using median values (e.g., median length, median middle length, and/or interior median height) for a batch of particles.

According to one embodiment, the body 801 of the shaped abrasive particle can have particular dimensions, which may facilitate improved performance. For example, in one instance, the body can have an interior height (hi), which can be the smallest dimension of height of the body as measured along a dimension between any corner and opposite midpoint edge on the body. In particular instances, wherein the body is a generally triangular two-dimensional shape, the interior height (hi) may be the smallest dimension of height (i.e., measure between the bottom surface 804 and the upper surface 805) of the body for three measurements taken between each of the three corners and the opposite midpoint edges. The interior height (hi) of the body of a shaped abrasive particle is illustrated in FIG. 8B. According to one embodiment, the interior height (hi) can be at least about 28% of the width (w). The height (hi) of any particle may be measured by sectioning or mounting and grinding the shaped abrasive particle and viewing in a manner sufficient (e.g., light microscope or SEM) to determine the smallest height (hi) within the interior of the body 801. In one particular embodiment, the height (hi) can be at least about 29% of the width, such as at least about 30%, or even at least about 33% of the width of the body. For one non-limiting embodiment, the height (hi) of the body can be not greater than about 80% of the width, such as not greater than about 76%, not greater than about 73%, not greater than about 70%, not greater than about 68% of the width, not greater than about 56% of the width, not greater than about 48% of the width, or even not greater than about 40% of the width. It will be appreciated that the height (hi) of the body can be within a range between any of the above noted minimum and maximum percentages.

A batch of shaped abrasive particles can be fabricated, wherein the median interior height value (Mhi) can be controlled, which may facilitate improved performance. In particular, the median internal height (hi) of a batch can be related to a median width of the shaped abrasive particles of the batch in the same manner as described above. Notably, the median interior height (Mhi) can be at least about 28%, such as at least about 29%, at least about 30%, or even at least about 33% of the median width of the shaped abrasive particles of the batch. For one non-limiting embodiment, the median interior height (Mhi) of the body can be not greater than about 80%, such as not greater than about 76%, not greater than about 73%, not greater than about 70%, not greater than about 68% of the width, not greater than about 56% of the width, not greater than about 48% of the width, or even not greater than about 40% of the median width. It will be appreciated that the median interior height (Mhi) of the body can be within a range between any of the above noted minimum and maximum percentages.

Furthermore, the batch of shaped abrasive particles may exhibit improved dimensional uniformity as measured by the standard deviation of a dimensional characteristic from a suitable sample size. According to one embodiment, the shaped abrasive particles can have an interior height variation (Vhi), which can be calculated as the standard deviation of interior height (hi) for a suitable sample size of particles from a batch. According to one embodiment, the interior height variation can be not greater than about 60 microns, such as not greater than about 58 microns, not greater than about 56 microns, or even not greater than about 54 microns. In one non-limiting embodiment, the interior height variation (Vhi) can be at least about 2 microns. It will be appreciated that the interior height variation of the body can be within a range between any of the above noted minimum and maximum values.

For another embodiment, the body of the shaped abrasive particle can have an interior height (hi) of at least about 400 microns. More particularly, the height may be at least about 450 microns, such as at least about 475 microns, or even at least about 500 microns. In still one non-limiting embodiment, the height of the body can be not greater than about 3 mm, such as not greater than about 2 mm, not greater than about 1.5 mm, not greater than about 1 mm, not greater than about 800 microns. It will be appreciated that the height of the body can be within a range between any of the above noted minimum and maximum values. Moreover, it will be appreciated that the above range of values can be representative of a median interior height (Mhi) value for a batch of shaped abrasive particles.

For certain embodiments herein, the body of the shaped abrasive particle can have particular dimensions, including for example, a width≥length, a length≥height, and a width≥height. More particularly, the body 801 of the shaped abrasive particle can have a width (w) of at least about 600 microns, such as at least about 700 microns, at least about 800 microns, or even at least about 900 microns. In one non-limiting instance, the body can have a width of not greater than about 4 mm, such as not greater than about 3 mm, not greater than about 2.5 mm, or even not greater than about 2 mm. It will be appreciated that the width of the body can be within a range between any of the above noted minimum and maximum values. Moreover, it will be appreciated that the above range of values can be representative of a median width (Mw) for a batch of shaped abrasive particles.

The body 801 of the shaped abrasive particle can have particular dimensions, including for example, a length (L middle or Lp) of at least about 0.4 mm, such as at least about 0.6 mm, at least about 0.8 mm, or even at least about 0.9 mm. Still, for at least one non-limiting embodiment, the body 801 can have a length of not greater than about 4 mm, such as not greater than about 3 mm, not greater than about 2.5 mm, or even not greater than about 2 mm. It will be appreciated that the length of the body 801 can be within a range between any of the above noted minimum and maximum values. Moreover, it will be appreciated that the above range of values can be representative of a median length (Ml), which may be more particularly, a median middle length (MLmiddle) or median profile length (MLp) for a batch of shaped abrasive particles.

The shaped abrasive particle can have a body 801 having a particular amount of dishing, wherein the dishing value (d) can be defined as a ratio between an average height of the body 801 at the corners (Ahc) as compared to smallest dimension of height of the body at the interior (hi). The average height of the body 801 at the corners (Ahc) can be calculated by measuring the height of the body at all corners and averaging the values, and may be distinct from a single value of height at one corner (hc). The average height of the body 801 at the corners or at the interior can be measured using a STIL (Sciences et Techniques Industrielles de la Lumiere-France) Micro Measure 3D Surface Profilometer (white light (LED) chromatic aberration technique). Alternatively, the dishing may be based upon a median height of the particles at the corner (Mhc) calculated from a suitable sampling of particles from a batch. Likewise, the interior height (hi) can be a median interior height (Mhi) derived from a suitable sampling of shaped abrasive particles from a batch. According to one embodiment, the dishing value (d) can be not greater than about 2, such as not greater than about 1.9, not greater than about 1.8, not greater than about 1.7, not greater than about 1.6, or even not greater than about 1.5. Still, in at least one non-limiting embodiment, the dishing value (d) can be at least about 0.9, such as at least about 1.0. It will be appreciated that the dishing ratio can be within a range between any of the minimum and maximum values noted above. Moreover, it will be appreciated that the above dishing values can be representative of a median dishing value (Md) for a batch of shaped abrasive particles.

The shaped abrasive particles of the embodiments herein, including for example, the body 801 of the particle of FIG. 6A can have a bottom surface 804 defining a bottom area (A_b).

In particular instances the bottom surface 804 can be the largest surface of the body 801. The bottom surface can have a surface area defined as the bottom area (A_b) that is greater than the surface area of the upper surface 803. Additionally, the body 801 can have a cross-sectional midpoint area (A_m) defining an area of a plane perpendicular to the bottom area and extending through a midpoint 881 (between the top and bottom surfaces) of the particle. In certain instances, the body 801 can have an area ratio of bottom area to midpoint area (A_b/A_m) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above. Moreover, it will be appreciated that the above area ratios can be representative of a median area ratio for a batch of shaped abrasive particles.

Furthermore the shaped abrasive particles of the embodiments herein, including for example, the particle of FIG. 6B can have a normalized height difference of at least about 0.3. The normalized height difference can be defined by the absolute value of the equation [(hc-hm)/(hi)]. In other embodiments, the normalized height difference can be not greater than about 0.26, such as not greater than about 0.22, or even not greater than about 0.19. Still, in one particular embodiment, the normalized height difference can be at least about 0.04, such as at least about 0.05, at least about 0.06. It will be appreciated that the normalized height difference can be within a range between any of the minimum and maximum values noted above. Moreover, it will be appreciated that the above normalized height values can be representative of a median normalized height value for a batch of shaped abrasive particles.

In another instance, the body 801 can have a profile ratio of at least about 0.04, wherein the profile ratio is defined as a ratio of the average difference in height [hc-hm] to the length (Lmiddle) of the shaped abrasive particle, defined as the absolute value of [(hc-hm)/(Lmiddle)]. It will be appreciated that the length (Lmiddle) of the body can be the distance across the body 801 as illustrated in FIG. 6B. Moreover, the length may be an average or median length calculated from a suitable sampling of particles from a batch of shaped abrasive particles as defined herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above. Moreover, it will be appreciated that the above profile ratio can be representative of a median profile ratio for a batch of shaped abrasive particles.

According to another embodiment, the body 801 can have a particular rake angle, which may be defined as an angle between the bottom surface 804 and a side surface 805, 806 or 807 of the body. For example, the rake angle may be within a range between about 1° and about 80°. For other particles herein, the rake angle can be within a range between about 5° and 55°, such as between about 100 and about 50°, between about 150 and 50°, or even between about 200 and 50°. Formation of an abrasive particle having such a rake angle can improve the abrading capabilities of the abrasive particle. Notably, the rake angle can be within a range between any two rake angles noted above.

According to another embodiment, the shaped abrasive particles herein, including for example the particles of FIGS. 6A and 6B can have an ellipsoidal region 817 in the upper surface 803 of the body 801. The ellipsoidal region 817 can be defined by a trench region 818 that can extend around the upper surface 803 and define the ellipsoidal region 817. The ellipsoidal region 817 can encompass the midpoint 881. Moreover, it is thought that the ellipsoidal region 817 defined in the upper surface can be an artifact of the forming process, and may be formed as a result of the stresses imposed on the mixture during formation of the shaped abrasive particles according to the methods described herein.

The shaped abrasive particle can be formed such that the body includes a crystalline material, and more particularly, a polycrystalline material. Notably, the polycrystalline material can include abrasive grains. In one embodiment, the body can be essentially free of an organic material, including for example, a binder. More particularly, the body can consist essentially of a polycrystalline material.

In one aspect, the body of the shaped abrasive particle can be an agglomerate including a plurality of abrasive particles, grit, and/or grains bonded to each other to form the body 801 of the abrasive particle 800. Suitable abrasive grains can include nitrides, oxides, carbides, borides, oxynitrides, oxyborides, diamond, superabrasives (e.g., cBN) and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, the abrasive particle 800 is formed such that the abrasive grains forming the body 800 include alumina, and more particularly, may consist essentially of alumina. In an alternative embodiment, the shaped abrasive particles can include geosets, including for example, polycrystalline compacts of abrasive or superabrasive materials including a binder phase, which may include a metal, metal alloy, super alloy, cermet, and a combination thereof. Some exemplary binder materials can include cobalt, tungsten, and a combination thereof.

The abrasive grains (i.e., crystallites) contained within the body may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron. Still, the average grain size of the abrasive grains contained within the body can be at least about 0.01 microns, such as at least about 0.05 microns, such as at least about 0.08 microns, at least about 0.1 microns, or even at least about 1 micron. It will be appreciated that the abrasive grains can have an average grain size within a range between any of the minimum and maximum values noted above.

In accordance with certain embodiments, the abrasive particle can be a composite article including at least two different types of abrasive grains within the body. It will be appreciated that different types of abrasive grains are abrasive grains having different compositions with regard to each other. For example, the body can be formed such that is includes at least two different types of abrasive grains, wherein the two different types of abrasive grains can be nitrides, oxides, carbides, borides, oxynitrides, oxyborides, diamond, and a combination thereof.

In accordance with an embodiment, the abrasive particle 800 can have an average particle size, as measured by the largest dimension measurable on the body 801, of at least about 100 microns. In fact, the abrasive particle 800 can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the abrasive particle 800 can have an average particle size that is not greater than about 5 mm, such as not greater than about 3 mm, not greater than about 2 mm, or even not greater than about 1.5 mm. It will be appreciated that the abrasive particle 100 can have an average particle size within a range between any of the minimum and maximum values noted above.

Figure 6C:
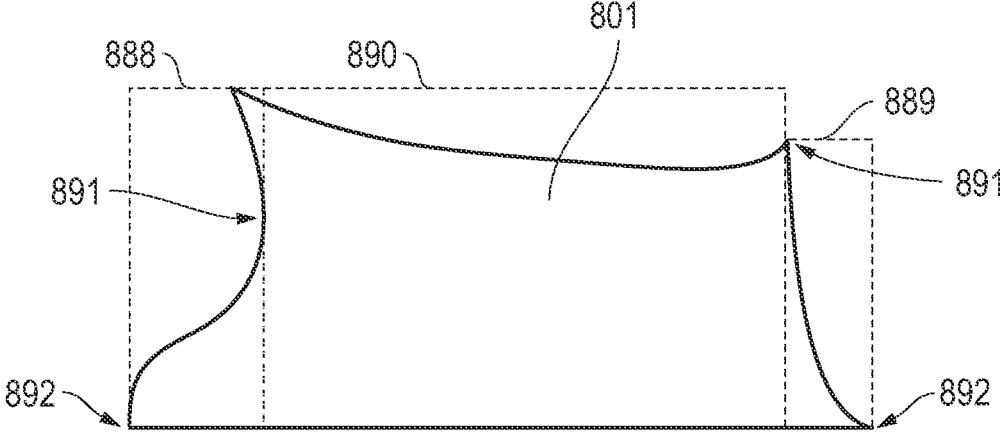
FIG. 6C includes a side-view illustration of a shaped abrasive particle according to an embodiment.
Figure 7:
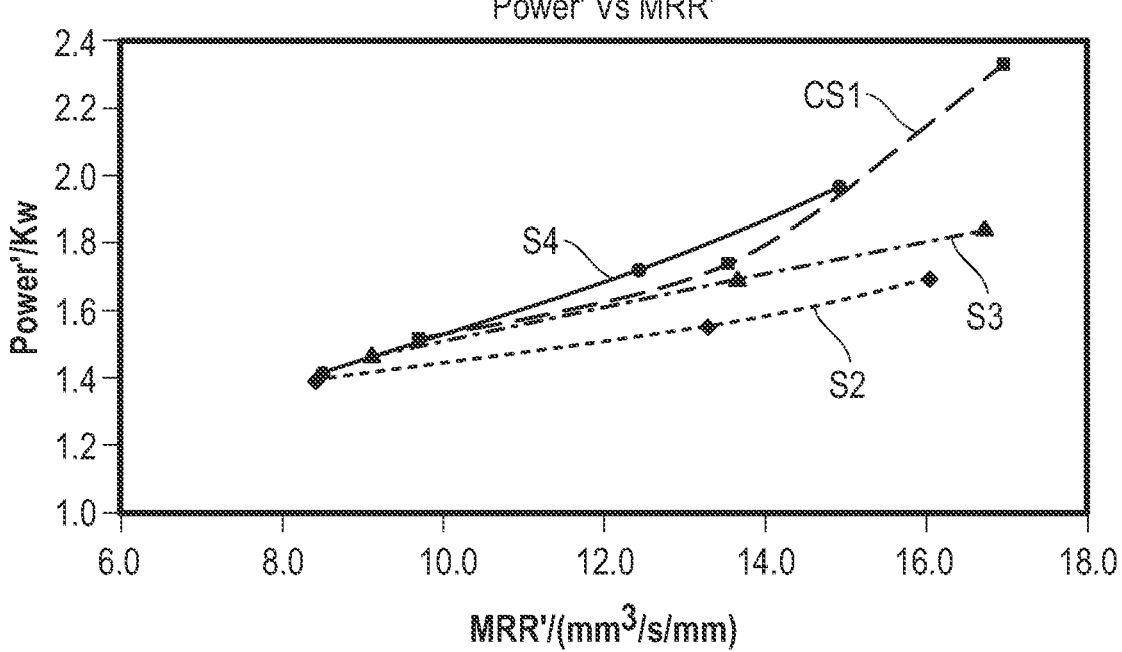
FIG. 7 includes a plot of power draw vs. material removal rate of abrasive samples.

The shaped abrasive particles of the embodiments herein can have a percent flashing that may facilitate improved performance. Notably, the flashing defines an area of the particle as viewed along one side, such as illustrated in FIG. 6C, wherein the flashing extends from a side surface of the body within the boxes 888 and 889. The flashing can represent tapered regions proximate to the upper surface and bottom surface of the body. The flashing can be measured as the percentage of area of the body along the side surface contained within a box extending between an innermost point of the side surface (e.g., 891) and an outermost point (e.g., 892) on the side surface of the body. In one particular instance, the body can have a particular content of flashing, which can be the percentage of area of the body contained within the boxes 888 and 889 compared to the total area of the body contained within boxes 888, 889, and 890. According to one embodiment, the percent flashing (f) of the body can be at least about 10%. In another embodiment, the percent flashing can be greater, such as at least about 12%, such as at least about 14%, at least about 16%, at least about 18%, or even at least about 20%. Still, in a non-limiting embodiment, the percent flashing of the body can be controlled and may be not greater than about 45%, such as not greater than about 40%, or even not greater than about 36%. It will be appreciated that the percent flashing of the body can be within a range between any of the above minimum and maximum percentages. Moreover, it will be appreciated that the above flashing percentages can be representative of an average flashing percentage or a median flashing percentage for a batch of shaped abrasive particles.

The percent flashing can be measured by mounting the shaped abrasive particle on its side and viewing the body at the side to generate a black and white image, such as illustrated in FIG. 6C. A suitable program for creating and analyzing images including the calculation of the flashing can be ImageJ software. The percentage flashing can be calculated by determining the area of the body 801 in the boxes 888 and 889 compared to the total area of the body as viewed at the side (total shaded area), including the area in the center 890 and within the boxes 888 and 889. Such a procedure can be completed for a suitable sampling of particles to generate average, median, and/or and standard deviation values.

A batch of shaped abrasive particles according to embodiments herein may exhibit improved dimensional uniformity as measured by the standard deviation of a dimensional characteristic from a suitable sample size. According to one embodiment, the shaped abrasive particles can have a flashing variation (Vf), which can be calculated as the standard deviation of flashing percentage (f) for a suitable sample size of particles from a batch. According to one embodiment, the flashing variation can be not greater than about 5.5%, such as not greater than about 5.3%, not greater than about 5%, or not greater than about 4.8%, not greater than about 4.6%, or even not greater than about 4.4%. In one non-limiting embodiment, the flashing variation (Vf) can be at least about 0.1%. It will be appreciated that the flashing variation can be within a range between any of the minimum and maximum percentages noted above.

The shaped abrasive particles of the embodiments herein can have a height (hi) and flashing multiplier value (hiF) of at least 4000, wherein hiF=(hi)(f), an "hi" represents a minimum interior height of the body as described above and "f" represents the percent flashing.

In one particular instance, the height and flashing multiplier value (hiF) of the body can be greater, such as at least about 4500 micron %, at least about 5000 micron %, at least about 6000 micron %, at least about 7000 micron %, or even at least about 8000 micron %. Still, in one non-limiting embodiment, the height and flashing multiplier value can be not greater than about 45000 micron %, such as not greater than about 30000 micron %, not greater than about 25000 micron %, not greater than about 20000 micron %, or even not greater than about 18000 micron %. It will be appreciated that the height and flashing multiplier value of the body can be within a range between any of the above minimum and maximum values. Moreover, it will be appreciated that the above multiplier value can be representative of a median multiplier value (MhiF) for a batch of shaped abrasive particles.

The shaped abrasive particles of the embodiments herein can have a dishing (d) and flashing (F) multiplier value (dF) as calculated by the equation $dF=(d)(F)$, wherein dF is not greater than about 90%, "d" represents the dishing value, and "f" represents the percentage flashing of the body. In one particular instance, the dishing (d) and flashing (F) multiplier value (dF) of the body can be not greater than about 70%, such as not greater than about 60%, not greater than about 55%, not greater than about 48%, not greater than about 46%. Still, in one non-limiting embodiment, the dishing (d) and flashing (F) multiplier value (dF) can be at least about 10%, such as at least about 15%, at least about 20%, at least about 22%, at least about 24%, or even at least about 26%. It will be appreciated that the dishing (d) and flashing (F) multiplier value (dF) of the body can be within a range between any of the above minimum and maximum values. Moreover, it will be appreciated that the above multiplier value can be representative of a median multiplier value (MdF) for a batch of shaped abrasive particles.

The shaped abrasive particles of the embodiments herein can have a height and dishing ratio (hi/d) as calculated by the equation $hi/d=(hi)/(d)$, wherein hi/d is not greater than about 1000, "hi" represents a minimum interior height as described above, and "d" represents the dishing of the body. In one particular instance, the ratio (hi/d) of the body can be not greater than about 900 microns, not greater than about 800 microns, not greater than about 700 microns, or even not greater than about 650 microns. Still, in one non-limiting embodiment, the ratio (hi/d), can be at least about 10 microns, such as at least about 50 microns, at least about 100 microns, at least about 150 microns, at least about 200 microns, at least about 250 microns, or even at least about 275 microns. It will be appreciated that the ratio (hi/d) of the body can be within a range between any of the above minimum and maximum values. Moreover, it will be appreciated that the above height and dishing ratio can be representative of a median height and dishing ratio (Mhi/d) for a batch of shaped abrasive particles.

The mixture can optionally include one or more filler materials. The filler material may provide improved mechanical properties and facilitate formation of the abrasive article. The filler material can be distinct from the abrasive particles. For instance, the filler material may have a hardness less than a hardness of the abrasive particles. The filler material may also be distinct from compositions contained within bond precursor material. In at least one embodiment, the filler material can include various materials, such as fibers, woven materials, non-woven materials, particles, minerals, nuts, shells, oxides, alumina, carbide, nitrides, borides, organic materials, polymeric materials, naturally occurring materials, and a combination thereof. In particular instances, the filler material can include a material such as wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), cryolite, glass, glass fibers, titanates (e.g., potassium titanate fibers), zircon, rock wool, clay, sepiolite, an iron sulfide (e.g., $Fe_2S_3$, $FeS_2$, or a combination thereof), fluorspar ($CaF_2$), potassium sulfate ($K_2SO_4$), graphite, potassium fluoroborate ($KBF_4$), potassium aluminum fluoride ($KAlF_4$), zinc sulfide (ZnS), zinc borate, borax, boric acid, fine alundum powders, P15A, bubbled alumina, cork, glass spheres, silver, Saran™ resin, paradichlorobenzene, oxalic acid, alkali halides, organic halides, and attapulgite.

Formation of the mixture can include forming a dry or wet mixture. It may be suitable to create a wet mixture to facilitate homogenous dispersion of the components within the mixture. A skilled artisan will appreciate that the mixture can include other materials, including for example additives, binders, or any other materials known in the art to facilitate formation of a mixture to create a green product prior to formation of the abrasive article. In at least one embodiment, the mixture can be essentially free of a pore former.

Referring again to FIG. 1, after forming the mixture, the process can continue to step 104. The process may include forming the mixture into a green body. Techniques, such as pressing, molding, casting, cutting, printing, curing, depositing, drying, heating, cooling, or any combination thereof, may be used to form a green body. The process may then continue to forming the green body into the finally-formed abrasive article. In certain instances, the process of forming the green body and the process for forming the finally-formed abrasive article can be combined, such that the mixture is converted directly to the finally-formed abrasive article. Suitable processes for forming the finally-formed abrasive article can include pressing, molding, casting, cutting, printing, curing, depositing, drying, heating, cooling, or any combination thereof.

In one particular embodiment, the process for forming the finally-formed abrasive article can include heat treating the mixture. In accordance with an embodiment, the process of heat treating can include heating the mixture to a temperature sufficient to form a vitreous bond material from the bond precursor material. In accordance with an embodiment, heat treating can include heating the mixture to a forming temperature of not greater than 1250° C., such as not greater than 1200° C., not greater than 1150° C., not greater than 1100° C., not greater than 1050° C., or even not greater than 950° C. Still, in at least one non-limiting embodiment, the process of heat treating can include heating the mixture including abrasive particles, ceramic particles, and bond material to a forming temperature of at least 850° C., such as at least 875° C., at least 900° C., at least 920° C., or even at least 950° C. It will be appreciated that the forming temperature can be within a range including any of the minimum and maximum values noted above. The forming temperature may be at or above the melting temperature of the bond precursor material.

Heat treating may further include heating the mixture in a non-oxidizing atmosphere. In at least another embodiment, the process of heat treating can include heating the mixture in a nitrogen-rich atmosphere, and more particularly an atmosphere that consists essentially of nitrogen. Furthermore, it will be appreciated that a non-oxidizing atmosphere can include one or more noble gases. Still, in another embodiment, the process of heat treating can be conducted in an ambient atmosphere (i.e., air).

After heat treating to form the abrasive body, the abrasive body may be incorporated into an abrasive article. In a particular embodiment, the abrasive body can be bonded abrasive body, and the abrasive article can include a bonded abrasive article. It will be appreciated that the abrasive body may have any suitable size and shape as known in the art and can be incorporated into various types of abrasive articles to form an abrasive article suitable for conducting material removal operations including but not limited to, abrasive wheels, cones, hones, cups, flanged-wheels, tapered cups, segments, mounted-point tools, discs, thin wheels, grinding wheels, large diameter cut-off wheels, and the like.

Figure 3A:
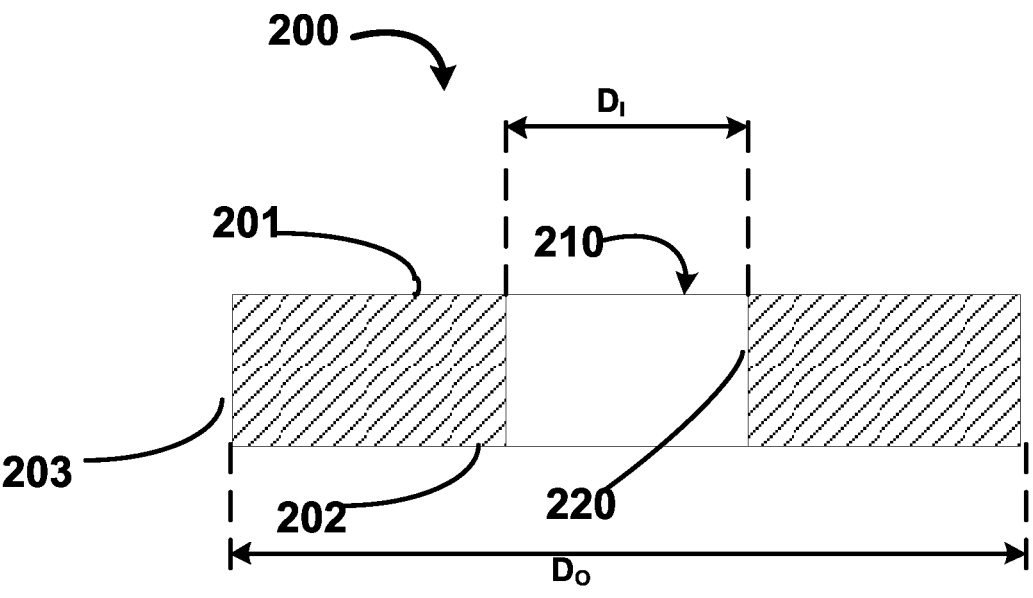
FIG. 3A includes an illustration of a cross section of an abrasive body according to an embodiment.

Referring to FIG. 3A, a cross section of the abrasive body 200 of an exemplary abrasive wheel is illustrated. The body 200 includes a first major surface 201, a second major surface 202 opposite the first major surface 201, and an outer peripheral surface 203 extending between the first major surface 201 and the second major surface 202, defining an outer diameter $D_o$ of the body 200. The body 200 includes an inner circumferential surface 220 defining a central opening 210 and an inner diameter $D_I$ of the body 200.

In an embodiment, the outer peripheral surface of the abrasive body can be profiled. For example, the outer peripheral surface can include surface features to facilitate a material removal operation on a workpiece. In particular, the surface features can be complimentary to surface features of the workpiece. In the illustrated example, the surface features can include geometric features. In further embodiments, the surface features may include grooves, threads, a particular roughness, or the like to facilitate material removal operations on workpieces. An exemplary abrasive article may include a gear grinding wheel.

Figure 3B:
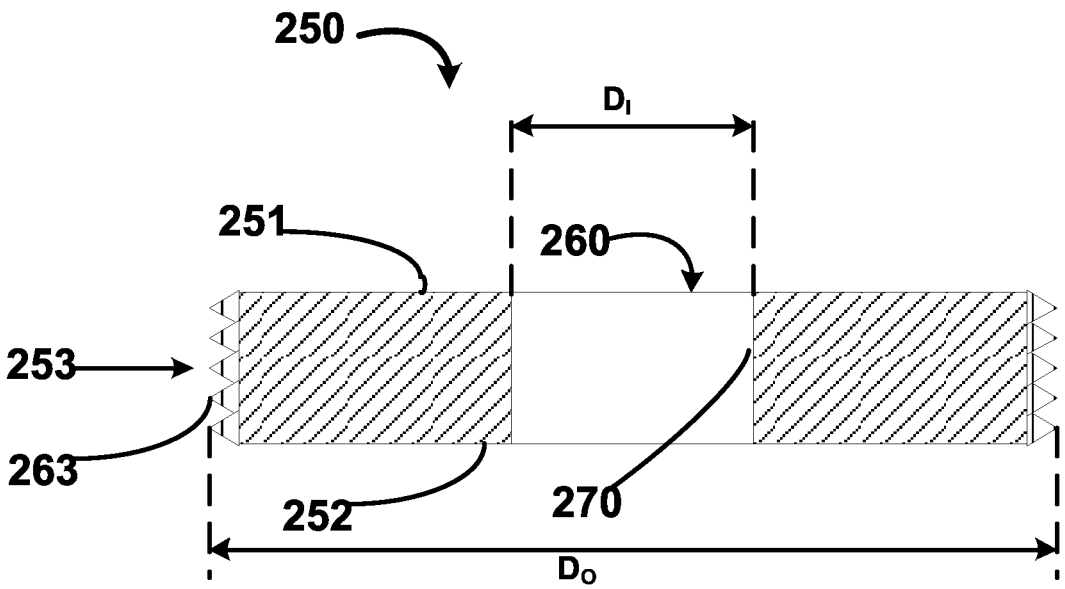
FIG. 3B includes an illustration of a cross section of an abrasive body according to another embodiment.

Referring to FIG. 3B, a cross section of the abrasive body 250 of another exemplary abrasive article is illustrated. Similar to the body 200, the body 250 includes a central opening 260, a first major surface 251, a second major surface 252 opposite the first major surface 251, and an outer peripheral surface 253 extending between the first major surface 251 and the second major surface 252. The outer peripheral surface 253 includes surface features, such as geometric features, 263. In another example, the surface features, such as geometric features 263, may be disposed on the inner circumferential surface, such as the surface 270.

In an embodiment, the abrasive body can include a particular content of bond material that can facilitate improved performance of the abrasive article. In an aspect, the body can include at least 2 vol % of the bond material for a total volume of the body, such as at least 4 vol %, at least 5 vol % or at least 6 vol % or at least 7 vol % or at least 8 vol % or at least 9 vol % or at least 10 vol % or at least 11 vol % or at least 12 vol % or at least 13 vol % or at least 14 vol % or at least 15 vol % or at least 16 vol % or at least 17 vol % or at least 18 vol % or at least 19 vol % or at least 20 vol % of the bond material for a total volume of the body. In another aspect, the abrasive body can include at most 35 vol % of the bond material for the total volume of the body, such as at most 30 vol % or at most 25 vol % or at most 20 vol %. Moreover, the abrasive body can include a content of the bond material in a range including any of the minimum and maximum percentages noted herein.

In an embodiment, the bond material can include a ceramic material, an amorphous material, or a combination thereof. A ceramic material is a composition that includes at least one metal or metalloid element, including but not limited to alkali metal element, alkaline earth metal elements, lanthanoids, transition metal elements, and a combination thereof. A particular example of a ceramic material may include oxides, carbides, nitrides, borides, and a combination thereof. In another embodiment, the bond material may include a single crystalline phase, a polycrystalline phase, an amorphous phase, or a combination thereof.

In an embodiment, the bond material can include a vitreous material. The vitreous material can have an amorphous phase. For instance, the bond material can consist essentially of a vitreous material having an amorphous phase. In another embodiment, the bond material can include a non-vitreous material. The non-vitreous material can include a polycrystalline phase. In still another embodiment, the bond material can include a mixture of polycrystalline and vitreous material.

In an embodiment, the bond material can include boron oxide ($B_2O_3$) in a particular content that may facilitate improved forming and/or performance of the abrasive article. Boron oxide can be present in a certain weight percentage compared to the total weight of the bond material. For example, boron oxide may be at most 30 wt % boron oxide ($B_2O_3$) for a total weight of the bond material, at most 28 wt %, at most 26 wt %, at most 24 wt %, or at most 22 wt %. For another instance, the bond material can include at least 2 wt % of boron oxide for a total weight of the bond material, such as at least 3 wt %, at least 4 wt %, or at least 5 wt %. In a particular instance, the content of boron oxide can be greater than 5 wt %, such as at least 6 wt %, at least 7 wt %, at least 8 wt %, at least 10 wt %, at least 12 wt %, or even at least 15 wt %. It will be understood that the content of boron oxide in the bond material can be in a range including any minimum to maximum percentages noted herein. For example, the bond material can include boron oxide in a range of 2 wt % to 30 wt %, in a range of 5 wt % to 30 wt %, or in a range of 8 wt % to 22 wt %.

In an embodiment, the bond material can include silicon oxide ($SiO_2$) in a certain content that may facilitate improved forming and/or performance of the abrasive article. The content of silicon oxide relative to the total weight of the bond material can be, for example, at most 80 wt %, at most 75 wt %, at most 70 wt %, at most 66 wt %, at most 65 wt %, at most 63 wt %, at most 60 wt %, at most 55 wt %, at most 52 wt %, or at most 50 wt %. In a particular instance, the bond material can include silicon oxide of less than 66 wt %. In another instance, the bond material can include at least 25 wt % silicon oxide, such as at least 30 wt %, at least 35 wt %, at least 38 wt %, at least 40 wt %, at least 42 wt %, at least 45 wt %, at least 47 wt %, at least 48 wt %, or even at least 49 wt %. It will be appreciated that the content of silicon oxide can be within a range including any minimum to maximum percentages noted above. For example, the silicon oxide content can be within a range of 35 wt % to 80 wt %, or within a range of 40 wt % to 65 wt %.

In a further embodiment, the bond material can include boron oxide and silicon oxide in a certain content that may facilitate improved forming and/or performance of the abrasive article. For instance, the total content of boron oxide and silicon oxide can be at most 80 wt %, such as at most 77 wt %, at most 75 wt %, at most 73 wt %, at most 70 wt %, at most 70 wt %, or at most 65 wt %. In another example, the total content of boron oxide and silicon oxide can be at least 40 wt %, at least 42 wt %, at least 46 wt %, at least 48 wt %, or even at least 50 wt % for a total weight of the bond material. It will be appreciated that the total content of boron oxide and silicon oxide can be within a range including any of the minimum and maximum percentages disclosed herein. For example, the total content of boron oxide and silicon oxide can be within a range from 40 wt % to 80 wt % or within a range from 42 wt % to 77 wt % or within a range from 46 wt % to 65 wt %.

In an embodiment, the bond material can include a particular ratio of weight percent silicon oxide ($SiO_2$): weight percent boron oxide ($B_2O_3$) that may facilitate improved forming and/or performance of the abrasive article. For example, the ratio can be at most 22:1, at most 21:1, at most 20:1, or at most 19:1. In a particular example, the ratio can be less than 19:1, such as at most 18:1, at most 16:1, at most 15:1, at most 12:1, at most 10:1, at most 9:1, at most 8:1, at most 7:1, at most 6.5:1, at most 6:1, at most 5.5:1, at most 5.2:1, at most 5:1, or at most 4.8:1. In another instance, the ratio of weight percent silicon oxide ($SiO_2$): weight percent boron oxide ($B_2O_3$) can be at least 1.3:1, at least 1.5:1, at least 1.7:1, at least 2:1, at least 2.2:1, at least 2.4:1, at least 2.6:1, at least 2.8:1, or at least 3:1. It will be appreciated that the ratio of weight percent silicon oxide ($SiO_2$):weight percent boron oxide ($B_2O_3$) can be within a range including any of the minimum and maximum values noted above, for example, the ratio can be within a range of 1:3 to 22:1 or within a range of 1:3 to 7:1.

In an embodiment, the bond material can include aluminum oxide ($Al_2O_3$) in a content that can facilitate improved forming and/or performance of the abrasive article. In an example, the bond material can include at least 5 wt % aluminum oxide ($Al_2O_3$) for a total weight of the bond material, at least 8 wt %, at least 9 wt %, at least 10 wt %, at least 12 wt %, or at least 14 wt %. In another example, the bond material can include at most 30 wt % aluminum oxide ($Al_2O_3$) for a total weight of the bond material, at most 28 wt %, at most 25 wt %, at most 23 wt %, or at most 20 wt %. In particular instance, the bond material can include at most or less than 20 wt % of aluminum oxide, such as at most 19 wt % or at most 18 wt % for the total weight of the bond material. It will be appreciated that the content of aluminum oxide can be within a range of any of the minimum and maximum percentages noted above, for instance, within a range of 5 wt % to 31 wt % or within a range of 10 wt % to 25 wt %.

In an embodiment, the bond material may include a content of aluminum and alumina that can facilitate improved forming and/or improved performance of the abrasive article. For example, the bond material can include at least 15 wt % of alumina and aluminum metal ($Al_2O_3/Al$) for a total weight of the bond material, such as at least 18 wt %, such as at least 20 wt %, at least 22 wt %, or even at least 24 wt % alumina and aluminum metal ($Al_2O_3/Al$) for a total weight of the bond material. In another example, the bond material can include at most 45 wt %, such as at most 42 wt %, at most 40 wt %, at most 38 wt %, at most 35 wt %, or even at most 32 wt % alumina and aluminum metal for a total weight of the bond material. It will be appreciated that the bond material can include a content of alumina and aluminum metal within a range including any of the minimum and maximum percentages noted herein. For instance, the content of alumina and aluminum metal can be within a range of 5 wt % to 45 wt % or within a range of 10 wt % to 40 wt % or within a range of 22 wt % to 35 wt % for the total weight of the bond material.

In an embodiment, the bond material can include aluminum oxide and silicon oxide. For instance, the total content of aluminum oxide and silicon oxide relative to the total weight of the bond material can be at least 50 wt %, such as at least 52 wt %, at least 56 wt %, at least 58 wt %, or even at least 60 wt %. In another example, the total content of aluminum oxide and silicon oxide can be at most 80 wt % for a total weight of the bond material, or at most 79 wt %. In a particular example, the total content of aluminum oxide and silicon oxide can be less than 79 wt %, such as at most 78 wt %, at most 77 wt %, at most 76 wt %, at most 75 wt %, at most 74 wt %, or at most 73 wt %. It will be appreciated that the total content of aluminum oxide and silicon oxide can be within a range of any of the minimum to maximum percentages noted herein, for instance, the total content can be within a range of 50 wt % to 79 wt %, within a range of 56 wt % to 75 wt %, or even within a range of 60 wt % to 73 wt %.

In an embodiment, the bond material can include a particular ratio of weight percent silicon oxide ($SiO_2$): weight percent aluminum oxide ($Al_2O_3$) that can facilitate improved forming and/or improved performance of the abrasive article. For instance, the ratio can be at most 5.5:1, at most 5:1, at most 4.5:1, at most 4:1, at most 3.5:1, at most 3:1, at most 2.5:1, at most 2.2:1, or at most 2:1. In another instance, the ratio of weight percent silicon oxide ($SiO_2$): weight percent aluminum oxide ($Al_2O_3$) can be at least 1.3:1, at least 1.5:1, at least 1.7:1, or at least 2:1. It will be appreciated that the ratio of weight percent silicon oxide to weight percent aluminum oxide can be within a range including any of the minimum and maximum ratios noted above, for example, the ratio can be within a range of 1:1 to 2.5:1 or within a range of 1.3:1 to 2.2:1.

In an embodiment, the bond material can include a particular content of zircon ($ZrSiO_4$) that may facilitate formation of the abrasive article and improve performance. For example, the bond material may include at least 1 wt % zircon for the total weight of the bond material, such as at least 2 wt % or at least 3 wt % or at least 4 wt % or at least 5 wt % or at least 6 wt % or at least 7 wt % or at least 8 wt % or at least 9 wt % or at least 10 wt % or at least 11 wt % or at least 12 wt % or at least 13 wt % or at least 14 wt % or at least 15 wt % or at least 16 wt % or at least 17 wt % or at least 18 wt % or at least 19 wt % or at least 20 wt % or at least 21 wt % or at least 22 wt % or at least 23 wt % or at least 24 wt % or at least 25 wt % or at least 26 wt % or at least 27 wt % or at least 28 wt % or at least 29 wt % for a total weight of the bond material. In another instance, the bond material may include at most 44 wt % zircon, at most 42 wt %, at most 40 wt %, at most 38 wt %, at most 36 wt %, at most 35 wt %, at most 34 wt %, at most 33 wt %, or at most 32 wt % for a total weight of the bond material. It will be appreciated that the bond material can include a content of zircon within a range including any of the minimum and maximum percentages noted above. In at least one embodiment, the bond material can be essentially free of zircon ($ZrSiO_4$).

In an embodiment, the bond material can include at least one alkaline earth oxide compound (RO) in a content that may facilitate improved forming and/or performance of the abrasive article. The total content of alkaline earth oxide compounds relative to the total weight of the bond material may be at most 6 wt %, at most 5 wt %, at most 4 wt %, at most 3.0 wt %, at most 2.5 wt %, or at most 2 wt %. In another embodiment, the total content of alkaline earth oxide compounds (RO) can be at least 0.5 wt % or at least 0.8 wt %. It will be appreciated that the total content of alkaline earth oxide compounds can be within a range including any of the minimum and maximum percentages noted herein, for instance, the total content can be within a range of 0.5 wt % to 5.0 wt %.

In an embodiment, the bond material can include at most 3 different alkaline earth oxide compounds (RO) selected from the group of calcium oxide (CaO), magnesium oxide (MgO), barium oxide (BaO), strontium oxide (SrO).

For instance, the bond material can include at least 0.5 wt % calcium oxide (CaO) for a total weight of the bond material, at least 0.8 wt %, or at least 1 wt %. Alternatively, or additionally, the bond material can include at most 3 wt % calcium oxide (CaO) for a total weight of the bond material, at most 2.8 wt %, or at most 2.5 wt %, at most 2 wt %, or at most 1.7 wt %. Moreover, the content of calcium oxide can be in a range including any of the minimum and maximum percentages noted herein. In at least one embodiment, the bond material can be essentially free of calcium oxide (CaO).

In an embodiment, the bond material can include an alkali oxide compound ($R_2O$). Exemplary alkali oxide compounds can include lithium oxide ($Li_2O$), sodium oxide ($Na_2O$), potassium oxide ($K_2O$), cesium oxide ($Cs_2O$), or the like. In a further embodiment, the bond material can include at least one alkali oxide compound. Particularly, the bond material comprises an alkali oxide compound ($R_2O$) selected from the group of compounds consisting of lithium oxide ($Li_2O$), sodium oxide ($Na_2O$), potassium oxide ($K_2O$), and cesium oxide ($Cs_2O$) and a combination thereof.

In an embodiment, the total content of the alkali oxide compounds relative to the total weight of the bond material can be at most 25 wt %, or at most 22 wt % or at most 20 wt %. Alternatively, or additionally, the total content of the alkali oxide compounds can be at least 3 wt %, at least 5 wt %, at least 7 wt %, or at least 9 wt %. It will be appreciated that the total content of alkali oxide compounds can be within a range of any of the minimum to maximum percentages noted herein. For example, the total content of alkali oxide compounds can be within a range of 3 wt % to 25 wt % or within a range of 7 wt % to 22 wt %.

In an embodiment, the bond material can include lithium oxide ($Li_2O$) in a content that can facilitate improved forming and/or performance of the abrasive article. For example, the bond material comprises at least 1 wt % lithium oxide ($Li_2O$) for a total weight of the bond material, at least 1.5 wt %, or at least 2 wt %. In another instance, the bond material can include at most 7 wt % lithium oxide ($Li_2O$) for a total weight of the bond material, at most 6.5 wt %, at most 6 wt %, at most 5.5 wt %, or at most 5 wt %. It will be appreciated that the content of lithium oxide can be within a range of any of the minimum to maximum percentages noted above, including for example, within a range of 1 wt % to 7 wt % or 1.5 wt % to 6 wt %. In at least one embodiment, the bond material is essentially free of lithium oxide ($Li_2O$).

In an embodiment, the bond material can include sodium oxide ($Na_2O$) in a content that can facilitate improved forming and/or performance of the abrasive article. The content of sodium oxide relative to the total weight of the bond material can be, for example, at least 3 wt %, at least 4 wt %, or at least 5 wt %. In another example, the content of sodium oxide can be at most 15 wt % sodium oxide ($Na_2O$) for a total weight of the bond material, at most 14 wt %, at most 13 wt %, at most 12 wt %, at most 11 wt %, or at most 10 wt %. It will be appreciated that the content of sodium oxide can be within a range of any of the minimum to maximum percentages noted above, including for example, within a range of 3 wt % to 14 wt % or within a range of 4 wt % to 11 wt %.

In an embodiment, the bond material can include potassium oxide ($K_2O$) in a content that can facilitate improved forming and or performance of the abrasive article. For instance, the content of potassium oxide for the total weight of the bond material can be at least 1 wt %, at least 1.5 wt %, or at least 2 wt %. In another instance, the content of potassium oxide ($K_2O$) can be at most 15 wt % for a total weight of the bond material, such as at most 13 wt %, at most 11 wt %, at most 10 wt %, at most 8 wt %, at most 7 wt %, at most 6.5 wt %, at most 6 wt %, or at most 5.5 wt %, or at most 5 wt %. It will be appreciated that the content of potassium oxide can be within a range of any of the minimum to maximum percentages noted herein, including for example, within a range of 1 wt % to 15 wt %.

In an embodiment, the bond material can include phosphorous oxide ($P_2O_5$) in a content that can facilitate improved forming and/or performance of the abrasive article. For example, the bond material can include at most 3.0 wt % phosphorous oxide ($P_2O_5$), such as at most 2 wt % or at most 1 wt %. In at least one embodiment, the bond material can be essentially free of phosphorus oxide ($P_2O_5$).

In an embodiment, the bond material can include a particular content of certain components that facilitates suitable formation and/or performance of the abrasive article. Such components can include manganese dioxide ($MnO_2$), iron oxide ($Fe_2O_3$), $ZrSiO_2$, $CoAl_2O_4$, titanium dioxide ($TiO_2$), or any combination thereof. For example, in one instance, the bond material can include at most 2 wt % of any one of manganese dioxide ($MnO_2$), iron oxide ($Fe_2O_3$), $ZrSiO_2$, $CoAl_2O_4$, or titanium dioxide ($TiO_2$) for the total weight of the bond material, such as at most 1 wt % or even at most 0.5 wt %. In at least one embodiment, the bond material can be essentially free of any one of or combination of manganese dioxide ($MnO_2$), iron oxide ($Fe_2O_3$), $ZrSiO_2$, $CoAl_2O_4$, or titanium dioxide ($TiO_2$).

In an embodiment, the body can include a particular total content of abrasive particles including agglomerated first abrasive particles and unagglomerated abrasive particles that can facilitate improved formation, structure, and/or performance of the abrasive article. For example, the total content of abrasive particles may be at least 20 vol % for a total volume of the body, at least 25 vol %, such as at least 30 vol %, or at least 35 vol % for a total volume of the body. In another example, the total content of abrasive particles may be at most 65 vol % for the total volume of the body, such as at most 64 vol %, at most 62 vol %, at most 60 vol %, at most 58 vol %, at most 56 vol %, at most 54 vol %, at most 52 vol %, at most 50 vol %, at most 45 vol %, or at most 40 vol % for the total volume of the body. Moreover, the total content of abrasive particles may be in a range including any of the minimum and maximum values noted herein.

In an embodiment, the abrasive body can include a particular content of agglomerated first abrasive particles that can facilitate improved performance of the abrasive article. In an aspect, the abrasive body can include agglomerated first abrasive particles in a content of at least 5 vol % for a total volume of the body, such as at least 8 vol %, at least 10 vol %, at least 12 vol %, at least 15 vol %, at least 18 vol %, at least 20 vol %, at least 22 vol %, at least 25 vol %, at least 30 vol %, or at least 35 vol % for the total volume of the body. In another aspect, the abrasive body can include at most 42 vol % of agglomerated first abrasive particles for the total volume of the body, such as at most 40 vol %, at most 38 vol %, at most 35 vol %, at most 32 vol %, at most 30 vol %, at most 28 vol %, at most 26 vol %, at most 22 vol %, at most 20 vol %, at most 18 vol %, at most 15 vol %, or at most 12 vol % for the total volume of the body. Moreover, the abrasive body can include a content of the agglomerated first abrasive particles in a range including any of the minimum and maximum percentages noted herein.

In an embodiment, the agglomerated first abrasive particles can be present in a particular content relative to the total content of abrasive particles. In an example, the agglomerated first abrasive particles may be at least 5 vol % relative to the total content of abrasive particles, such as at least 8 vol %, at least 10 vol %, at least 12 vol %, at least 15 vol %, at least 20 vol %, at least 23 vol %, at least 25 vol %, at least 28 vol %, at least 30 vol %, at least 35 vol %, at least 38 vol %, at least 40 vol %, at least 42 vol %, at least 44 vol %, at least 46 vol %, at least 50 vol %, at least 53 vol %, at least 55 vol %, at least 58 vol %, at least 60 vol %, at least 63 vol %, at least 65 vol %, at least 67 vol %, at least 70 vol %, at least 72 vol %, or at least 75 vol % relative to the total content of abrasive particles. In another example, the agglomerated first abrasive particles may be at most 90 vol % relative to the total content of abrasive particles, such as at most 88 vol %, at most 85 vol %, at most 80 vol %, at most 75 vol %, at most 72 vol %, at most 70 vol %, at most 67 vol %, at most 65 vol %, at most 63 vol %, at most 60 vol %, at most 58 vol %, at most 55 vol %, at most 53 vol %, at most 50 vol %, at most 46 vol %, at most 44 vol %, at most 42 vol %, at most 40 vol %, at most 38 vol %, at most 35 vol %, at most 30 vol %, at most 28 vol %, at most 25 vol %, at most 23 vol %, at most 20 vol %, or at most 15 vol % relative to the total content of abrasive particles. Moreover, the agglomerated first abrasive particles can be in a content relative to the total content of the abrasive particles in a range including any of the minimum and maximum percentages noted herein.

In an embodiment, the abrasive body may include a particular content of the elongated second abrasive particles that can facilitate improved formation, structure, and/or performance of the body. In an example, the abrasive body may include the elongated second abrasive particles in a content of at least 10 vol % for a total volume of the body, such as at least 15 vol %, at least 20 vol %, at least 24 vol %, at least 26 vol %, at least 30 vol %, at least 32 vol %, at least 35 vol %, at least 38 vol %, or at least 40 vol % of the total volume of the body. In another example, the abrasive body may include the elongated second abrasive particles in a content of at most 55 vol % for the total volume of the body, such as at most 50 vol %, at most 48 vol %, at most 45 vol %, at most 40 vol %, at most 38 vol %, at most 35 vol %, at most 32 vol %, at most 30 vol % or at most 28 vol % for the total volume of the body. Moreover, the body may include the elongated second abrasive particles in a content including any of the minimum and maximum percentages noted herein.

In a further embodiment, the abrasive body may include a total content in volume percentage of the unagglomerated abrasive particles for a total volume of the body, wherein the elongated second abrasive particle may be present in a particular content relative to the total content of the unagglomerated particles. In an example, the elongated second abrasive particles may be at least 55 vol % of the total content of the unagglomerated particles, such as at least 58 vol %, at least 60 vol %, at least 63 vol %, at least 65 vol %, at least 68 vol %, at least 70 vol %, at least 73 vol %, at least 75 vol %, at least 78 vol %, at least 80 vol %, at least 82 vol %, at least 85 vol %, at least 87 vol %, at least 90 vol %, or at least 92 vol % for the total content of the unagglomerated abrasive particles. In another example, the elongated second abrasive particles may be at most 99 vol % of the total content of the unagglomerated abrasive particles, such as at most 95 vol %, at most 92 vol %, at most 90 vol %, at most 85 vol %, at most 80 vol %, at most 75 vol %, at most 70 vol %, at most 65 vol %, at most 60 vol %, at most 55 vol %, or at most 50 vol %. Moreover, the elongated second abrasive particles may be present in a content relative to the total content of the unagglomerated abrasive particles in a range including any of the minimum and maximum percentages noted herein. In particular examples, the unagglomerated abrasive particles may consist essentially of elongated second abrasive particles, such as 99 vol % to 100 vol % of unagglomerated abrasive particles may include elongated second abrasive particles.

In another embodiment, unagglomerated abrasive particles include third abrasive particles. In another embodiment, the body may include third abrasive particles in a particular content that may facilitate improved formation, structure, and/or performance of the abrasive article. For example, the abrasive body may include third abrasive particles in a content of at most 25 vol % for the total volume of the body, such as at most 23 vol %, at most 21 vol %, at most 19 vol %, at most 18 vol %, at most 15 vol %, at most 13 vol %, at most 12 vol %, at most 10 vol %, at most 8 vol %, or at most 5 vol % for the total volume of the body. In another example, the body may include at least 0.5 vol % of third abrasive particles for the total volume of the body, such as at least 1 vol %, at least 2 vol %, at least 3 vol %, at least 5 vol %, at least 7 vol %, at least 9 vol %, or at least 10 vol %. Moreover, the abrasive body may include the third abrasive particles in a content in a range including any of the minimum and maximum percentages noted herein.

In another embodiment, the third abrasive particles may be present in a particular content for a total content of the abrasive particles contained in the body that may facilitate improved formation, structure, and/or performance of the abrasive article. In an aspect, the third abrasive particles may be at most 50 vol % for the total content of abrasive particles, such as at most 45 vol %, at most 40 vol %, at most 35 vol %, at most 30 vol %, at most 28 vol %, at most 25 vol %, at most 22 vol %, at most 20 vol %, at most 18 vol %, at most 15 vol %, at most 12 vol %, at most 10 vol %, at most 8 vol %, at most 5 vol %, or at most 3 vol %. In another aspect, the third abrasive particles may be in a content of at least 0.5 vol % for the total content of the abrasive particles, such as at least 1 vol %, at least 2 vol %, at least 3 vol %, at least 5 vol %, at least 7 vol %, at least 10 vol %, or at least 12 vol %. Moreover, the third abrasive particles may be in a content relative to the total content of the abrasive particles in a range including any of the minimum and maximum percentages noted herein. In particular examples, the body may be essentially free of the third abrasive particles.

In a further embodiment, the third abrasive particles may be present in a particular content relative to the total content of the unagglomerated abrasive particles that may facilitate improved formation, structure, and/or performance of the abrasive article. In an example, the third abrasive particles may be in a content of at most 45 vol % for the total content of the unagglomerated abrasive particles, such as at most 40 vol %, at most 35 vol %, at most 30 vol %, at most 25 vol %, at most 23 vol %, at most 22 vol %, at most 20 vol %, at most 18 vol %, at most 15 vol %, at most 13 vol %, at most 10 vol %, at most 9 vol %, or at most 5 vol % relative to the total content of unagglomerated abrasive particles. In an example, the third abrasive particles may be in a content of at least 0.5 vol % for the total content of the unagglomerated abrasive particles, such as at least 1 vol %, at least 2 vol %, at least 3 vol %, at least 5 vol %, at least 7 vol %, at least 10 vol %, or at least 12 vol % for the total content of the unagglomerated abrasive particles. Moreover, the third abrasive particles may be present in a content for the total content of the unagglomerated abrasive particles in a range including any of the minimum and maximum percentages noted herein. In a particular example, the unagglomerated abrasive particles may be essentially free of the third abrasive particles.

In an embodiment, the abrasive body may include a particular a ratio of Vaf/Ves that may facilitate improved formation, structure, and/or performance of the abrasive article, wherein Ves can be the content of the elongated second abrasive particles in volume percentage for the total volume of the body, and Vaf can be the content of the agglomerated first abrasive particles in volume percentage for a total volume of the body. In an aspect, the ratio of Vaf/Ves can be at least 1:8, at least 1:7, at least 1:6, at least 1:5, at least 1:4, at least 1:3, at least 1:2, at least 1:1, or at least 1.2:1. In another aspect, the ratio of Vaf/Ves may be at most 10:1, at most 9:1, at most 8:1, at most 7.5:1, at most 7:1, at most 6:1, at most 5:1, at most 4:1, at most 3:1, or at most 2:1. Moreover, the ratio of Vaf/Ves may be in a range including any of the minimum and maximum ratios noted herein. In a particular example, the ratio of Vaf/Ves may be in a range including at least 1:1 and at most 3:1.

In another embodiment, the abrasive body can include a particular ratio of Ves/Vt that can facilitate improved formation, structure, and/or performance of the abrasive article, wherein Ves can be the content of the elongated second abrasive particles in volume percentage for the total volume of the body, and Vt can be the content of the third abrasive particles in volume percentage for the total volume of the body. In an aspect, the ratio of Ves/Vt may be at least 0.5:1, at least 1:1, at least 2:1, at least 3:1, or at least 4:1. In an aspect, the ratio of Ves/Vt may be at most 30:1, such as at most 25:1, at most 20:1, at most 15:1, at most 10:1, at most 8:1, at most 5:1, at most 2:1, or at most 1:1. Moreover, the ratio of Ves/V5 can be in a range including any of the maximum and minimum ratios noted herein.

In at least one non-limiting embodiment, the body may include abrasive particles including unagglomerated abrasive particles consisting essentially of second abrasive particles. In another embodiment, the body may include abrasive particles including agglomerated abrasive particles consisting essentially of agglomerated first abrasive particles. In a further embodiment, the body may include abrasive particles that may consist essentially of agglomerated first abrasive particles and unagglomerated second abrasive particles.

In an embodiment, the abrasive body can include a particular porosity that can facilitate improved performance of the abrasive article. In an aspect, the body can include a porosity of at least 30 vol % for a total volume of the body, such as at least 32 vol %, at least 35 vol %, at least 38 vol %, at least 40 vol %, at least 42 vol %, at least 45 vol %, or at least 50 vol %. In another aspect, the body can include at most 85 vol % porosity for a total volume of the body, such as at most 80 vol %, at most 75 vol %, at most 70 vol %, at most 65 vol %, at most 62 vol %, at most 60 vol %, at most 55 vol %, at most 53 vol %, at most 50 vol %, at most 45 vol %, or at most 40 vol %. It will be appreciated that the porosity of the body can be within a range including any of the minimum to maximum percentages noted above.

The porosity of the abrasive body can be in various forms. For instance, the porosity can be closed, open, or include closed porosity and open porosity. In an embodiment, the porosity can include a type of porosity selected from the group consisting of closed porosity, open porosity, and a combination thereof. In another embodiment, the majority of the porosity can include open porosity, such as at least 60% of the porosity (vol %) may be open porosity, at least 70%, at least 80%, at least 90%, at least 93%, at least 95%, or at least 98% of the porosity may be open porosity. In a particular embodiment, all of the porosity can essentially be open porosity.

In an embodiment, the abrasive body may include a particular content of open porosity. For example, the abrasive body may include at least 30 vol % of open porosity for a total volume of the abrasive body, such as at least 35 vol %, at least 40 vol %, at least 45 vol %, at least 47 vol %, at least 49 vol %, at least 52 vol %, or at least 55 vol % of open porosity for a total volume of the body. In another example, the abrasive body may include not greater than 70 vol % of open porosity for a total volume of the body, such as not greater than 68 vol %, not greater than 65 vol %, not greater than 62 vol %, not greater than 60 vol %, not greater than 57 vol %, not greater than 55 vol %, not greater than 52 vol %, or not greater than 50 vol % of open porosity for a total volume of the body. Moreover, the abrasive body may include a content of open porosity in a range including any of the minimum and maximum percentages noted herein.

In a further embodiment, the abrasive body may include a particular content of closed porosity, such as not greater than 8 vol %, not greater than 5 vol %, not greater than 3 vol %, or not greater than 1 vol % of closed porosity for a total volume of the abrasive body. In a particular embodiment, the body may be essentially free of closed porosity.

In an embodiment, the abrasive body may include a particular Modulus of Rupture (MOR) that may facilitate improved performance of the abrasive article. In an aspect, the abrasive body may include MOR of at least 25 MPa, at least 28 MPa, at least 30 MPa, at least 33 MPa, at least 35 MPa, at least 37 MPa, at least 42 MPa, or at least 45 MPa. In another aspect, the abrasive body may include MOR of not greater than 58 MPa, such as not greater than 55 MPa, not greater than 52 MPa, not greater than 50 MPa, not greater than 48 MPa, not greater than 46 MPa, or not greater than 44 MPa. In a further aspect, the abrasive body may include MOR in a range including any of the minimum and maximum values noted herein.

In a particular embodiment, the abrasive body may have a particular ratio, $R_P/m$, of permeability to MOR that may facilitate improved performance of the abrasive article. For example, the ratio, $R_{P/M}$, may be at least 0.8, such as at least 0.9, at least 1, at least 1.1, at least 1.2, at least 1.3, at least 1.4, at least 1.5, at least 1.6, at least 1.7, at least 1.8, or at least 2. In another example, the ratio, $R_{P/M}$, may be not greater than 2.5, such as not greater than 2.4, not greater than 2.3, not greater than 2.2, not greater than 2.1, not greater than 2, not greater than 1.9, or not greater than 1.8. Moreover, the ratio, Rpm, may be in a range including any of the minimum and maximum values noted herein.

The abrasive body can include pores having certain average pore sizes. In an embodiment, the average pore size may be at most 3 mm, at most 2.5 mm, at most 2 mm, at most 1.9 mm, at most 1.5 mm, at most 1 mm, at most 900 microns, at most 800 microns, at most 700 microns, at most 600 microns, at most 500 microns, at most 450 microns, at most 400 microns, at most 350 microns, at most 300 microns, at most 250 microns, at most 200 microns, at most 150 microns, or at most 100 microns. In another embodiment, the average pore size can be at least 0.01 microns, at least 10 microns, at least 20 microns, at least 30 microns, at least 50 microns, at least 70 microns, at least 80 microns, at least 85 microns, at least 90 microns, at least 95 microns, at least 100 microns, at least 110 microns, at least 120 microns, at least 130 microns, at least 140 microns, at least 150 microns, at least 160 microns, or even at least 200 microns. It will be appreciated that the body can have an average pore size in a range including any of the minimum to maximum values noted above. In this disclosure, the average pore size can be measured using ASTM standard E112 Standard Test Methods for Determining Average Grain Size. Cross-sectional images of the abrasive body were viewed at 60x magnification on a Hitachi Microscope. The macro to determine pore length follows a technique to measure crystal size based on including drawing 6 equally spaced lines on the image and determining the regions of the line that intersect with a pore. The regions of the lines that intersect the pore are measured. This process was repeated for seven different images of portions of the bonded abrasive body. After all images were analyzed the values were averaged to calculate the average pore size. Moreover, it will be appreciated that reference to the average pore size can also be reference to a mean pore size.

In an embodiment, the abrasive body may include a particular permeability that may facilitate improved performance of the abrasive article. In an example, the body may include a permeability having a Darcy's number of at least 35, such as at least 40, at least 45, at least 50, at least 55, at least 60, at least 65, at least 70, at least 90, at least 100, at least 110, at least 115, at least 120, or even at least 125. In another example, the permeability may include a Darcy's number of not greater than 350, such as not greater than 280, not greater than 250, not greater than 230, not greater than 200, or not greater than 180. In a further example, the permeability can be within a range including any of the minimum and maximum values noted herein.

Darcy's number is measured according to a gas permeability test, as detailed in ASTM C577 and developed by subcommittee and published at C08.03 Book of Standards Volume: 15.01. A sample is installed dry into a Gas Permeameter GP-100A from PMI Inc. of Ithaca, N.Y. The sample has a flat surface and thickness of 1.27 cm. The diameter of the O-ring which holds the sample determines the sample diameter, which is 1.07 cm. Air is forced to flow through the test sample at room temperature. A range of different pressure differentials from 0 to 3 psi are applied to the surface of the sample and the flow of the air through the sample is measured. The measurements of flow rate and the corresponding pressure drops (differential pressure) for the range of pressures from 0 to 3 psi is used to calculate the average Darcy's number, which defines the permeability of the bonded abrasive body.

Darcy's number (C) is calculated according to the equation $C=(8FTV)/[\pi D^2(P^2-1)]$, and defines the permeability through a porous medium, where "F" represents the flow, "T" represents the sample thickness (i.e., 1.27 cm), "V" represents the viscosity of the gas flowing through the sample (i.e., air having a viscosity of 0.0185 mPa s) "D" represents the diameter of the sample (i.e., 1.07 cm), "P" represents the pressure gradient across the sample thickness.

After reading the instant disclosure, a skilled artisan will appreciate the contents of the agglomerated first abrasive particles, elongated second abrasive particles, and third abrasive particles when used may be adjusted to form abrasive articles having structures, compositions, and/or properties to suit material removal operations. For instance, elongated second abrasive particles and/or agglomerated first abrasive particles may affect properties, such as porosity and/or density of green bodies and bonded abrasive bodies. It is noteworthy the combination of abrasive particles described in embodiments herein facilitates improved performance compared to a corresponding conventional abrasive article. A corresponding conventional abrasive article may be different from an abrasive article of embodiments herein only in first abrasive particles. For example, a corresponding conventional abrasive article may include unagglomerated first abrasive particles instead of agglomerated first abrasive particles. In another example, a corresponding conventional abrasive article may include agglomerated abrasive particles that do not include chromium oxide but otherwise the same as first abrasive particles.

The content of chromium oxide may be determined by utilizing Inductively Coupled Plasma analysis of abrasive particles. For example, the abrasive particles may be recovered from the finally formed abrasive body by using acid wash to dissolve the bond material and binder material. Abrasive particles having chromium oxide can appear light red (i.e., pink) to darker red and can be collected, dried, and analyzed by Inductively Coupled Plasma (ICP) for the content of chromium oxide. In particular, the recovery of the abrasive particles may be performed using acid washes as follows.

A wheel sample can be broken into small pieces. Approximately 3 g to 5 g of wheel pieces may be mixed with 25 ml of HCl aqueous solution of 36-38% (W/W). The mixture may be heated using a boiling water bath at atmospheric pressure for 1 hour. After cooling down, the mixture may be filtered, heated at 480° C. for 2 hours, and cooled down. The remaining solid residues may be mixed with 25 ml of HF solution of 49% (W/W), 4 ml HCl of 36-38% (W/W), and 1 ml HNO3 of 65-68% (W/W), which may be heated in the boiling water bath at atmospheric pressure for 1 hour, and then filtered after cooling down. The remaining solid may be heated at 480° C. for 2 hours and then further washed using 25 ml HCl aqueous solution of 36-38% (W/W), which may be facilitated by heating in the boiling water bath at atmospheric pressure for 1 hour or as needed, until the bond materials are completely dissolved. The mixture can be filtered and heated at 480° C. for 2 hours. After cooling down, grains that may appear light red (i.e., pink) to darker red can be collected and analyzed by ICP.

The collected grains may be ground to powder, and 0.5000±0.0100 grams of powder may be transferred into a Pt/Au crucible and mixed with lithium tetraborate ($Li_2B_4O_7$) of 3.0000±0.0100 g, after which 200 μl solution of 25% of lithium bromide may be added. Lithium tetraborate ($Li_2B_4O_7$) used in the analysis should have the purity of at least 99.998%. Lithium bromide used in the analysis should have the purity of at least 99.95%.

The crucible may be heated for the sample to fuse. For example, Phoenix VFD Fusion machine may be used following manufacturer's instructions. In brief, the temperature of the crucible can be set to 1300±30° C. Heat can be applied following the order of 60 s of pre-melt, 120 s of melting, and then 240 s of swirling. A clear melt should be obtained at the end of the fusion time. If a clear melt is not obtained, the fusion step should be repeated until a clear melt is obtained. The crucible may be cooled down with compressed air. The fused piece should be removed from the crucible carefully by gently tapping the bottom of the crucible. It can be appreciated equivalent apparatus can be used to obtain a fused sample.

The fused piece may be dissolved in 125 mL of deionized $H_2O$ having a resistivity of 18.2 MΩ*cm and 25 mL of 37% solution of HCl with the aid of a hotplate. After cooling down, the solution may be diluted with deionized $H_2O$ to 250 mL and then used for ICP analysis of the atoms included in the grains. The blank sample can be prepared by mixing 12.0±0.01 g of $Li_2B_4O_7$ with 80 ml HCl, and diluting the mixture with deionized $H_2O$ to a final volume of 1000 mL. The deionized $H_2O$ used in the analysis should have a resistivity of 18.2 MΩ*cm.

The standard solution may be prepared by mixing multi analyte solutions ALSPL-1 and ALSP-3 with the addition of 1000 ppm of P and Al that are purchased from a NIST traceable supplier. The standard solution should be diluted in series using the blank sample. An exemplary dilution series can include blank sample, 1:2500 dilution, 1:500 dilution, 1:100 dilution, and 1:25 dilution. The compositions of ALSPL-1 and ALSP-3 are included in Table 1 below.

TABLE 1

| | Analyte | g/L |
|---|---|---|
| ALSPL-1 | Ba | 0.1 |
| 7% (v/v) Nitric | Ca | 0.5 |
| Acid matrix | Ce | 0.1 |
| trace HF | Co | 0.1 |
| | Cr | 0.1 |
| | Cu | 0.1 |
| | Fe | 1 |
| | Ga | 0.1 |
| | K | 0.5 |
| | La | 0.1 |
| | Mn | 0.1 |
| | Na | 0.5 |
| | Nd | 0.1 |
| | Ni | 0.1 |
| | V | 0.1 |
| | Y | 1 |
| | Zn | 0.5 |
| ALSPL-3 | Hf | 0.1 |
| 7% (v/v) Nitric | Mo | 0.1 |
| Acid matrix | Nb | 0.1 |
| trace HF | Si | 2.5 |
| | Ta | 0.1 |
| | Ti | 5.0 |
| | Zr | 0.5 |

ICP may be performed following the instructions of a typical ICP mass spectrometer, such as Agilent 700 Series ICP Optical Emission Spectrometers.

An oxide content may be determined by the below formula as a percentage by mass, wherein A represents element (e.g., chromium) in ppm, B represents final volume in liter, C represents dilution factor, D represents gravimetric factor of the element to oxide, and E represents weight of the sample in milligrams.

$$\% = \frac{A*B*C*D}{E}*100\%$$

It can be appreciated that the reading of the spectrum of a same sample may vary between different analysis, for example, by different operators and/or the uses of different standard solutions. The ICP data from different analysis of the same sample can be comparable after taking into consideration of the constant ratio of the standard solutions.

In a further embodiment, the bonded abrasive body may have a particular density. For example, the density may be at least 1.6 g/cm$^3$, at least 1.64 g/cm$^3$, at least 1.67 g/cm$^3$, at least 1.69 g/cm$^3$, at least 1.7 g/cm$^3$, or at least 1.73 g/cm$^3$. In a further example, the density may be at most 2.3 g/cm$^3$, at most 2.15 g/cm$^3$, at most 2.05 g/cm$^3$, at most 1.95 g/cm$^3$, or at most 1.92 g/cm$^3$. In a further example, the density may be in a range including any of the minimum and maximum values noted herein. For example, the bonded abrasive body may have a density in a range including at least 1.6 g/cm$^3$ to at most 2.3 g/cm$^3$ or in a range including at least 1.6 g/cm$^3$ to at most 2.1 g/cm$^3$.

In particular implementations, the abrasive articles can include compositions noted in embodiments herein and a targeted density of at least 1.6 g/cm$^3$ and at most 2.3 g/cm$^3$.

The abrasive articles can have notably improved performance. In at least one embodiment, the abrasive article representative of embodiments herein can have improved performance including power draw, G-Ratio, wear rate, profile retention, and/or material removal rate compared to a corresponding conventional abrasive article.

Figure 4:
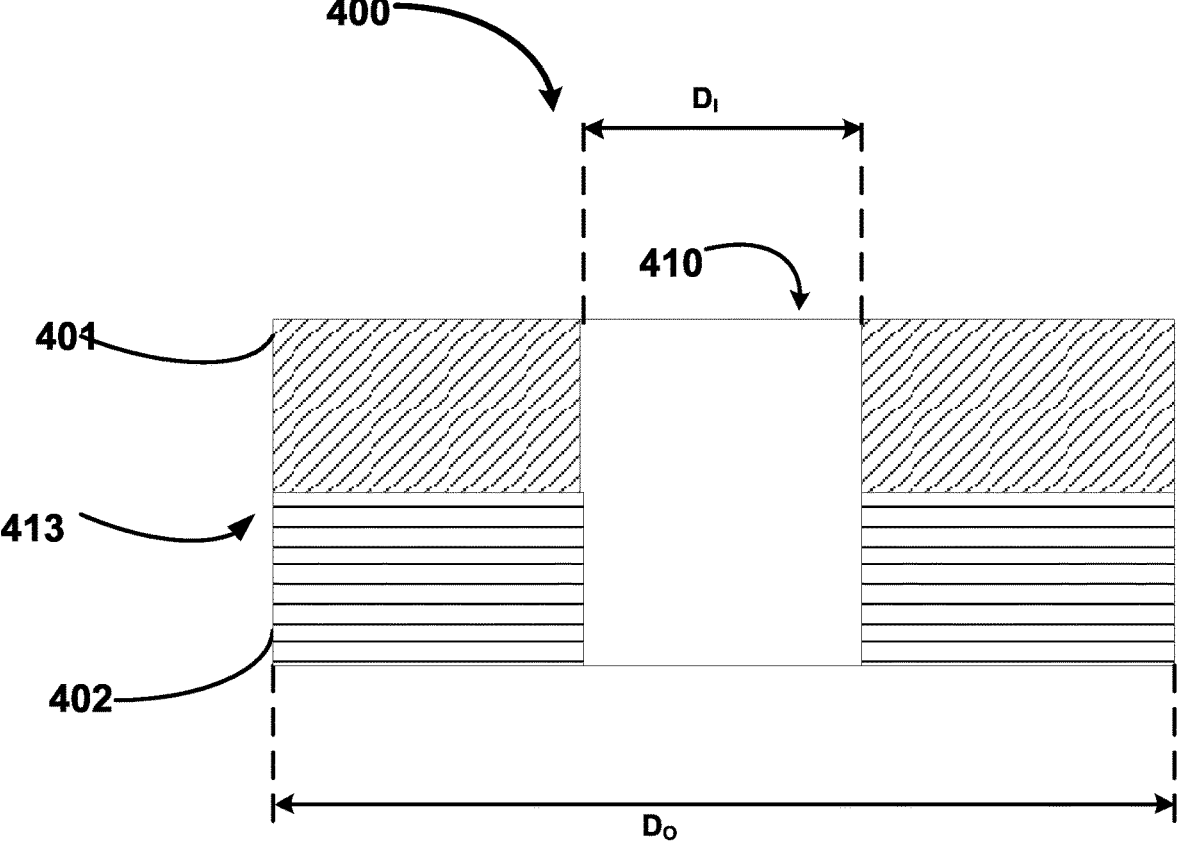
FIG. 4 includes an illustration of a cross section of a body of an abrasive article according to another embodiment.

FIG. 4 includes an illustration of a cross section of a body 400 of an exemplary abrasive article including a first portion 401 and a second portion 402. The first portion 401 is coupled to the second portion 402 in the axial direction. In a particular example, the first portion 401 may be bonded to the second portion 402.

As illustrated, the body 400 includes inner diameter D$_I$ defined by the central opening 410 that extends through the first and second portion 401 and 402 and an outer diameter D$_O$ defined by the outer peripheral surface 413. In exemplary implementation, surface features may be formed on the outer peripheral surface 413.

In an example, any or both of the first and second portions 401 and 402 can have features of the abrasive body described in embodiments herein.

In a particular example, the first portion 401 may be an abrasive portion including any of the features of the abrasive body described in embodiments herein, and the second portion 402 may include a different bond material, different abrasive particles, or both. For example, the second portion 402 may include an organic bond material. An exemplary organic bond material may include resin bonds including phenolic resins, urea-formaldehyde resins, melamine-formaldehyde resins, urethane resins, acrylate resins, polyester resins, aminoplast resins, epoxy resins, or any combinations thereof. In another example, the second portion 402 may include an inorganic material including a vitrified bond material or a metal bond material. In another example, the second portion can include abrasive particles noted in embodiments herein.

Figure 5:
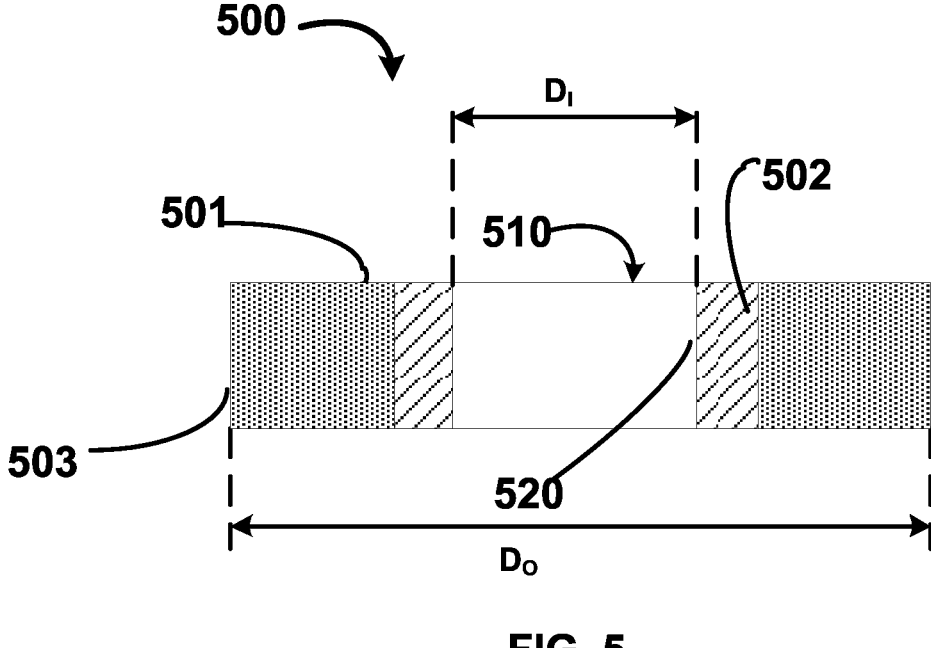
FIG. 5 includes an illustration of a cross section of a body of an abrasive article according to another embodiment.

FIG. 5 includes an illustration of a cross section of a body 500 of an exemplary abrasive article including a peripheral portion 501, a central portion 502, and a central opening 510 extending through the body 500. The peripheral portion 501 is coaxial with the central portion 502. The outer peripheral surface 503 defines the outer diameter D$_O$ of the body 500. The inner circumferential surface 520 defines the inner diameter D$_I$. The peripheral portion 501 is coupled to the central portion 502 in the radial direction. The peripheral portion 501 can be an abrasive portion and include any features described in embodiments herein in relation to the abrasive body.

The central portion 502 may include a bond material different from the bond material of the peripheral portion 501. In exemplary implementations, the central portion 502 may include an organic bond material including a material noted in relation to the second portion 402 illustrated in FIG. 4. In a further example, the central portion 502 may include abrasive particles. For example, the central portion 502 may include any of the abrasive particles described in embodiments herein. In another example, the central portion 502 may be essentially free of abrasive particles. In particular examples, the central portion 502 may facilitate improved strength of the peripheral portion 501.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. An abrasive article, comprising a body including: a bond material; agglomerated first abrasive particles, wherein first abrasive particles comprise chromium oxide ($Cr_2O_3$); and elongated second abrasive particles.

Embodiment 2. An abrasive article, comprising a body including: a bond material; agglomerated first abrasive particles, wherein first abrasive particles comprise at least 0.3 wt % of chromium oxide ($Cr_2O_3$) for a total weight of the first abrasive particles; and a porosity in a range including at least 30 vol % and at most 85 vol % for a total volume of the body.

Embodiment 3. The abrasive article of Embodiment 1 or 2, wherein the body comprises agglomerated first abrasive particles in a content of at least 5 vol % for a total volume of the body, at least 8 vol %, at least 10 vol %, at least 12 vol %, at least 15 vol %, at least 18 vol %, at least 20 vol %, at least 22 vol %, at least 25 vol %, at least 30 vol %, or at least 35 vol % for a total volume of the body.

Embodiment 4. The abrasive article of Embodiment 1 or 2, wherein the body comprises agglomerated first abrasive particles in a content of at most 42 vol % for a total volume of the body, at most 40 vol %, at most 38 vol %, at most 35 vol %, at most 32 vol %, at most 30 vol %, at most 28 vol %, at most 26 vol %, at most 22 vol %, at most 20 vol %, at most 18 vol %, at most 15 vol %, or at most 12 vol % for a total volume of the body.

Embodiment 5. The abrasive article of any one of Embodiments 1 to 4, wherein the agglomerated first abrasive particles are at least 5 vol % relative to a total content of abrasive particles, at least 8 vol %, at least 10 vol %, at least 12 vol %, at least 15 vol %, at least 20 vol %, at least 23 vol %, at least 25 vol %, at least 28 vol %, at least 30 vol %, at least 35 vol %, at least 38 vol %, at least 40 vol %, at least 42 vol %, at least 44 vol %, at least 46 vol %, at least 50 vol %, at least 53 vol %, at least 55 vol %, at least 58 vol %, at least 60 vol %, at least 63 vol %, at least 65 vol %, at least 67 vol %, at least 70 vol %, at least 72 vol %, or at least 75 vol % relative to a total content of abrasive particles.

Embodiment 6. The abrasive article of any one of Embodiments 1 to 5, wherein the agglomerated first abrasive particles are at most 90 vol % relative to a total content of abrasive particles, at most 88 vol %, at most 85 vol %, at most 80 vol %, at most 75 vol %, at most 72 vol %, at most 70 vol %, at most 67 vol %, at most 65 vol %, at most 63 vol %, at most 60 vol %, at most 58 vol %, at most 55 vol %, at most 53 vol %, at most 50 vol %, at most 46 vol %, at most 44 vol %, at most 42 vol %, at most 40 vol %, at most 38 vol %, at most 35 vol %, at most 30 vol %, at most 28 vol %, at most 25 vol %, at most 23 vol %, at most 20 vol %, or at most 15% relative to a total content of abrasive particles.

Embodiment 7. The abrasive article of any one of Embodiments 1 to 6, wherein the body comprises unagglomerated abrasive particles including elongated second abrasive particles, wherein the elongated second abrasive particles are at least 51 vol % of a total content of the unagglomerated abrasive particles, at least 55 vol %, at least 58 vol %, at least 60 vol %, at least 63 vol %, at least 65 vol %, at least 68 vol %, at least 70 vol %, at least 73 vol %, at least 75 vol %, at least 78 vol %, at least 80 vol %, at least 82 vol %, at least 85 vol %, at least 87 vol %, at least 90 vol %, or at least 92 vol %.

Embodiment 8. The abrasive article of any one of Embodiments 1 to 7, wherein the body comprises unagglomerated abrasive particles consisting of elongated second abrasive particles.

Embodiment 9. The abrasive article of any one of Embodiments 1 to 7, wherein the body comprises unagglomerated abrasive particles including elongated second abrasive particles, wherein the elongated second abrasive particles are at most 99 vol % for a total content of the unagglomerated abrasive particles, at most 95 vol %, at most 92 vol %, at most 90 vol %, at most 85 vol %, at most 80 vol %, at most 75 vol %, at most 70 vol %, at most 65 vol %, at most 60 vol %, at most 55 vol %, or at most 50 vol %.

Embodiment 10. The abrasive article of any one of Embodiments 1 to 9, wherein the body comprises a content of elongated second abrasive particles, Ves (vol %), for a total volume of the body, and a content of agglomerated first abrasive particles Vaf (vol %), for a total volume of the body, wherein a ratio of Vaf/Vs is at least 1:8, at least 1:7, at least 1:6, at least 1:5, at least 1:4, at least 1:3, at least 1:2, at least 1:1, or at least 1.2:1.

Embodiment 11. The abrasive article of any one of Embodiments 1 to 10, wherein the body comprises a content of elongated second abrasive particles, Ves (vol %), for a total volume of the body, and a content of agglomerated first abrasive particles Vaf (vol %), for a total volume of the body, wherein a ratio of Vaf/Ves is at most 10:1, at most 9:1, at most 8:1, at most 7.5:1, at most 7:1, at most 6:1, at most 5:1, at most 4:1, at most 3:1, or at most 2:1.

Embodiment 12. The abrasive article of any one of Embodiments 1 to 11, wherein the body comprises a content of elongated second abrasive particles, Ves (vol %), for a total volume of the body, and a content of agglomerated first abrasive particles Vaf (vol %), for a total volume of the body, wherein a ratio of Vaf/Vs is wherein the ratio of Vaf/Ves is at least 1:1 and at most 3:1.

Embodiment 13. The abrasive article of any one of Embodiments 1 to 12, wherein the body comprises second elongated abrasive particles comprising an average aspect ratio of length:width of at least 2:1, at least 3:1, at least 4:1 or at least 5:1.

Embodiment 14. The abrasive article of any one of Embodiments 1 to 13, wherein the body comprises second elongated abrasive particles comprising an average aspect ratio of length:width of at most 20:1, at most 18:1, at most 16:1, at most 15:1, at most 13:1, at most 11:1, at most 10:1, or at most 8:1.

Embodiment 15. The abrasive article of any one of Embodiments 1 to 14, wherein the agglomerated first abrasive particles comprise abrasive particles bonded by a binder material.

Embodiment 16. The abrasive article of any one of Embodiments 1 to 15, wherein the agglomerated first abrasive particles comprise fused alumina abrasive particles.

Embodiment 17. The abrasive article of any one of Embodiments 1 to 16, wherein the agglomerated first abrasive particles comprise at least 0.3 wt % of chromium oxide for a total weight of the first abrasive particles, at least 0.5 wt %, at least 0.7 wt %, at least 1 wt %, at least 1.2 wt %, at least 1.3 wt %, or at least 1.4 wt % for a total weight of the first abrasive particles.

Embodiment 18. The abrasive article of any one of Embodiments 1 to 17, wherein the agglomerated first abrasive particles comprises at most 5.0 wt % of chromium oxide for a total weight of the first abrasive particles, at most 4.5 wt %, at most 4.0 wt %, at most 3.5 wt %, at most 3.0 wt %, at most 2.5 wt %, at most 2.3 wt %, at most 2 wt %, at most 1.9 wt %, at most 1.8 wt %, at most 1.7 wt % or at most 1.6 wt % for a total weight of the first abrasive particles.

Embodiment 19. The abrasive article of any one of Embodiments 1 to 18, wherein the agglomerated first abrasive particles comprise at least 50 wt % of alumina for a total weight of first abrasive particles, at least 60 wt %, at least 70 wt %, at least 80 wt %, at least 90 wt %, at least 95 wt %, at least 96 wt %, at least 97 wt %, or at least 98 wt % of alumina.

Embodiment 20. The abrasive article of any one of Embodiments 1 to 19, wherein the body comprises second elongated abrasive particles including sol-gel alumina, fused alumina, microcrystalline alumina, nanocrystalline alumina, or any combination thereof.

Embodiment 21. The abrasive article of any one of Embodiments 1 to 20, wherein the body comprises second abrasive particles comprising at least 50 wt % of alumina for a total weight of the second elongated abrasive particles, at least 60 wt %, at least 70 wt %, at least 80 wt %, at least 90 wt %, at least 95 wt %, at least 96 wt %, at least 97 wt %, or at least 98 wt % of alumina for the total weight of the elongated second abrasive particles.

Embodiment 22. The abrasive article of any one of Embodiments 1 to 21, wherein the body comprises a total content of abrasive particles of at least 20 vol % for a total volume of the body, at least 25 vol %, at least 30 vol %, or at least 35 vol % for a total volume of the body.

Embodiment 23. The abrasive article of any one of Embodiments 1 to 22, wherein the body comprises a total content of abrasive particles of at most 65 vol % for a total volume of the body, at most 64 vol %, or at most 62 vol % or at most 60 vol % or at most 58 vol % or at most 56 vol % or at most 54 vol % or at most 52 vol %, at most 50 vol %, at most 45 vol %, or at most 40 vol %.

Embodiment 24. The abrasive article of Embodiment 2, wherein the body comprises elongated second abrasive particles.

Embodiment 25. The abrasive article of any one of Embodiments 1 to 24, wherein the body comprises unagglomerated abrasive particles comprising elongated second abrasive particles and third abrasive particles including a material selected form the group consisting of silicon dioxide, silicon carbide, alumina, zirconia, flint, garnet, emery, rare earth oxides, rare earth-containing materials, cerium oxide, sol-gel derived particles, gypsum, iron oxide, glass-containing particles, and a combination thereof.

Embodiment 26. The abrasive article of Embodiment 25, wherein the third abrasive particles are in a content of at most 25 vol % for a total volume of the body, at most 23 vol %, at most 21 vol %, at most 19 vol %, at most 18 vol %, at most 15 vol %, at most 13 vol %, at most 12 vol %, at most 10 vol %, at most 8 vol %, or at most 5 vol %.

Embodiment 27. The abrasive article of any one of Embodiments 1 to 26, wherein the body comprises a content of elongated second abrasive particles, Ves (vol %), for a total volume of the body, a content of third abrasive particles, Vt (vol %) for a total volume of the body, and a ratio of Ves/Vt of at least 1:2, at least 1:1, at least 2:1, at least 3:1, or at least 4:1.

Embodiment 28. The abrasive article of any one of Embodiments 1 to 27, wherein the body comprises a content of elongated second abrasive particles, Ves (vol %), for a total volume of the body, a content of third abrasive particles, Vt (vol %) for a total volume of the body, and a ratio of Ves/Vt of at most 30:1, at most 25:1, at most 20:1, at most 15:1, at most 10:1, at most 8:1, at most 5:1, at most 2:1, or at most 1:1.

Embodiment 29. The abrasive article of any one of Embodiments 1 to 28, wherein the body comprises at least 2 vol % of the bond material for a total volume of the body, at least 4 vol %, at least 5 vol %, at least 10 vol %, or at least 20 vol % of the bond material for the total volume of the body.

Embodiment 30. The abrasive article of any one of Embodiments 1 to 29, wherein the body comprises at most 35 vol % of the bond material for a total volume of the body, at most 30 vol %, at most 25 vol %, at most 20 vol % of the bond material for the total volume of the body.

Embodiment 31. The abrasive article of any one of Embodiments 1 to 30, wherein the bond material comprises an amorphous phase, a ceramic phase, a monocrystalline phase, or any combination thereof.

Embodiment 32. The abrasive article of any one of Embodiments 1 to 31, wherein the bond material comprises an inorganic material including a vitreous material, a ceramic material, or any combination thereof.

Embodiment 33. The abrasive article of any one of Embodiments 1 to 32, wherein the bond material comprises a vitrified bond material.

Embodiment 34. The abrasive article of any one of Embodiments 1 to 33, wherein the bond material comprises at most 30 wt % boron oxide ($B_2O_3$) for a total weight of the bond material, at most 28 wt %, at most 26 wt %, at most 24 wt %, or at most 22 wt %.

Embodiment 35. The abrasive article of any one of Embodiments 1 to 34, wherein the bond material comprises at least 5 wt % boron oxide ($B_2O_3$) for the total weight of the bond material, at least 8 wt %, at least 10 wt %, at least 12 wt %, or at least 15 wt %.

Embodiment 36. The abrasive article of any one of Embodiments 1 to 35, wherein the bond material comprises at most 80 wt % silicon oxide ($SiO_2$) for the total weight of the bond material, at most 75 wt %, at most 70 wt %, at most 69 wt %, at most 66 wt %, at most 65 wt %, at most 60 wt %, at most 55 wt %, at most 52 wt %, or at most 50 wt %.

Embodiment 37. The abrasive article of any one of Embodiments 1 to 36, wherein the bond material comprises at least 25 wt % silicon oxide ($SiO_2$) for the total weight of the bond material, at least 35 wt %, at least 38 wt %, or at least 40 wt %.

Embodiment 38. The abrasive article of any one of Embodiments 1 to 37, wherein the bond comprises boron oxide ($B_2O_3$) and silicon oxide ($SiO_2$), and wherein the total content of boron oxide and silicon oxide is at most 80 wt %, at most 77 wt %, at most 75 wt %, at most 73 wt %, at most 70 wt %, at most 70 wt %, or at most 65 wt %.

Embodiment 39. The abrasive article of any one of Embodiments 1 to 38, wherein the bond comprises boron oxide ($B_2O_3$) and silicon oxide ($SiO_2$), and wherein the total content of boron oxide and silicon oxide is at least 40 wt %, at least 42 wt %, at least 46 wt %, at least 48 wt %, or at least 50 wt %.

Embodiment 40. The abrasive article of any one of Embodiments 1 to 39, the bond material comprises a ratio of weight percent silicon oxide ($SiO_2$):weight percent boron oxide ($B_2O_3$) of at most 7:1, at most 6.5:1, at most 6:1, at most 5.5:1, at most 5.2:1, at most 5:1, or at most 4.8:1.

Embodiment 41. The abrasive article of any one of Embodiments 1 to 40, wherein the bond material comprises a ratio of weight percent silicon oxide ($SiO_2$):weight percent boron oxide ($B_2O_3$) of at least 1.3:1, at least 1.5:1, at least 1.7:1, at least 2.0:1, at least 2.2:1, at least 2.4:1, at least 2.6:1, at least 2.8:1, or at least 3:1.

Embodiment 42. The abrasive article of any one of Embodiments 1 to 41, wherein the bond comprises at least 8 wt % aluminum oxide ($Al_2O_3$) for a total weight of the bond material, at least 9 wt %, at least 10 wt %, at least 12 wt %, or at least 14 wt %.

Embodiment 43. The abrasive article of any one of Embodiments 1 to 42, wherein the bond comprises at most 30 wt % aluminum oxide ($Al_2O_3$) for a total weight of the bond material, at most 28 wt %, at most 25 wt %, at most 23 wt %, or at most 20 wt %.

Embodiment 44. The abrasive article of any one of Embodiments 1 to 43, wherein the bond comprises aluminum oxide ($Al_2O_3$) and silicon oxide ($SiO_2$), and wherein the total content of aluminum oxide and silicon oxide is at least 50 wt % for a total weight of the bond material, at least 52 wt %, at least 56 wt %, at least 58 wt %, or at least 60 wt %.

Embodiment 45. The abrasive article of any one of Embodiments 1 to 44, wherein the bond comprises aluminum oxide ($Al_2O_3$) and silicon oxide ($SiO_2$), and wherein the total content of aluminum oxide and silicon oxide is at most 80 wt % for a total weight of the bond material, at most 77 wt %, at most 75 wt %, or at most 73 wt %.

Embodiment 46. The abrasive article of any one of Embodiments 1 to 45, wherein the bond material comprises a ratio of weight percent silicon oxide ($SiO_2$):weight percent aluminum oxide ($Al_2O_3$) of at most 5.5:1, at most 5:1, at most 4.5:1, at most 4:1, at most 3.5:1, at most 3:1, at most 2.5:1, at most 2.2:1, or at most 2:1.

Embodiment 47. The abrasive article of any one of Embodiments 1 to 46, wherein the bond material comprises a ratio of weight percent silicon oxide ($SiO_2$):weight percent aluminum oxide ($Al_2O_3$) of at least 1.3:1, at least 1.5:1, at least 1.7:1, or at least 2:1.

Embodiment 48. The abrasive article of any one of Embodiments 1 to 47, wherein the bond material comprises a polycrystalline phase including zircon ($ZrSiO_4$).

Embodiment 49. The abrasive article of any one of Embodiments 1 to 48, wherein the bond material comprises at least 15 wt % zircon for a total weight of the bond material, at least 17 wt %, at least 19 wt %, at least 20 wt %, at least 21 wt %, at least 22 wt %, at least 23 wt %, or at least 24 wt % for a total weight of the bond material.

Embodiment 50. The abrasive article of any one of Embodiments 1 to 49, wherein the bond material comprises at most 44 wt % zircon, at most 42 wt %, at most 40 wt %, at most 38 wt %, at most 36 wt %, at most 35 wt %, at most 34 wt %, at most 33 wt %, or at most 32 wt %.

Embodiment 51. The abrasive article of any one of Embodiments 1 to 50, wherein the bond is essentially free of zircon ($ZrSiO_4$).

Embodiment 52. The abrasive article of any one of Embodiments 1 to 51, wherein the bond material comprises at least one alkaline earth oxide compound (RO), and wherein the total content of alkaline earth oxide compounds (RO) is at most 6 wt % for a total weight of the bond material, at most 5 wt %, at most 4 wt %, at most 3.0 wt %, at most 2.5 wt %, or at most 2 wt %.

Embodiment 53. The abrasive article of any one of Embodiments 1 to 52, wherein the bond material comprises at least one alkaline earth oxide compound (RO), and wherein the total content of alkaline earth oxide compounds (RO) is at least 0.5 wt % or at least 0.8 wt %.

Embodiment 54. The abrasive article of any one of Embodiments 1 to 53, wherein the bond material comprises at most 3 different alkaline earth oxide compounds (RO) selected from the group of calcium oxide (CaO), magnesium oxide (MgO), barium oxide (BaO), strontium oxide (SrO).

Embodiment 55. The abrasive article of any one of Embodiments 1 to 54, wherein the bond material comprises at least 0.5 wt % calcium oxide (CaO) for a total weight of the bond material, at least 0.8 wt %, or at least 1 wt %.

Embodiment 56. The abrasive article of any one of Embodiments 1 to 55, wherein the bond material is essentially free of calcium oxide (CaO).

Embodiment 57. The abrasive article of any one of Embodiments 1 to 56, wherein the bond material comprises at most 3 wt % calcium oxide (CaO) for a total weight of the bond material, at most 2.8 wt %, or at most 2.5 wt %, at most 2 wt %, or at most 1.7 wt %.

Embodiment 58. The abrasive article of any one of Embodiments 1 to 57, wherein the bond material comprises an alkali oxide compound ($R_2O$) selected from the group of compounds consisting of lithium oxide ($Li_2O$), sodium oxide ($Na_2O$), potassium oxide ($K_2O$), and cesium oxide ($Cs_2O$) and a combination thereof.

Embodiment 59. The abrasive article of any one of Embodiments 1 to 58, wherein the bond material comprises at least one alkali oxide compound (R2O), and wherein the total content of the alkali oxide compounds (RO) is at most 25 wt %, or at most 22 wt % or at most 20 wt %.

Embodiment 60. The abrasive article of any one of Embodiments 1 to 59, wherein the bond material comprises at least one alkali oxide compound ($R_2O$), and wherein the total content of the alkali oxide compounds ($R_2O$) is at least 3 wt %, at least 5 wt %, at least 7 wt %, or at least 9 wt %.

Embodiment 61. The abrasive article of any one of Embodiments 1 to 60, wherein the bond material comprises at least 1 wt % lithium oxide ($Li_2O$) for a total weight of the bond material, at least 1.5 wt %, or at least 2 wt %.

Embodiment 62. The abrasive article of any one of Embodiments 1 to 61, wherein the bond material is essentially free of lithium oxide ($Li_2O$).

Embodiment 63. The abrasive article of any one of Embodiments 1 to 62, wherein the bond material comprises at most 7 wt % lithium oxide ($Li_2O$) for a total weight of the bond material, at most 6.5 wt %, at most 6 wt %, at most 5.5 wt %, or at most 5 wt %.

Embodiment 64. The abrasive article of any one of Embodiments 1 to 63, wherein the bond material comprises at least 3 wt % sodium oxide ($Na_2O$) for a total weight of the bond material, at least 4 wt %, or at least 5 wt %.

Embodiment 65. The abrasive article of any one of Embodiments 1 to 64, wherein the bond material comprises at most 15 wt % sodium oxide ($Na_2O$) for a total weight of the bond material, at most 14 wt %, at most 13 wt %, at most 12 wt %, at most 11 wt %, or at most 10 wt %.

Embodiment 66. The abrasive article of any one of Embodiments 1 to 65, wherein the bond material comprises at least 1 wt % potassium oxide ($K_2O$) for a total weight of the bond material, at least 1.5 wt %, or at least 2 wt %.

Embodiment 67. The abrasive article of any one of Embodiments 1 to 66, wherein the bond material comprises at least 15 wt % potassium oxide ($K_2O$) for a total weight of the bond material, at most 13 wt %, at most 11 wt %, at most 10 wt %, at most 8 wt %, at most 7 wt %, at most 6.5 wt %, at most 6 wt %, or at most 5.5 wt %, or at most 5 wt %.

Embodiment 68. The abrasive article of any one of Embodiments 1 to 67, wherein the bond material comprises at most 3.0 wt % phosphorous oxide ($P_2O_5$) or wherein the bond material is essentially free of phosphorus oxide ($P_2O_5$).

Embodiment 69. The abrasive article of any one of Embodiments 1 to 68, wherein the bond material comprises a composition essentially free of oxide compounds selected from the group consisting of $TiO_2$, $Fe_2O_3$, $MnO_2$, $ZrSiO_2$, and $CoAl_2O_4$.

Embodiment 70. The abrasive article of any one of Embodiments 1 to 69, wherein the body comprises at least 30 vol % of porosity for a total volume of the body, at least 32 vol %, at least 35 vol %, at least 38 vol %, at least 40 vol %, at least 42 vol %, or at least 45 vol % for the total volume of the body.

Embodiment 71. The abrasive article of any one of Embodiments 1 to 70, wherein the body comprises at most 85 vol % porosity for a total volume of the body, at most 82 vol %, at most 80 vol %, at most 78 vol %, at most 75 vol %, at most 73 vol %, at most 70 vol %, at most 65 vol %, at most 60 vol %, at most 55 vol %, at most 53 vol %, at most 50 vol %, or at most 45 vol %.

Embodiment 72. The abrasive article of any one of Embodiments 1 to 71, wherein the body comprises unagglomerated particles including third abrasive particles, wherein the third abrasive particles may be in a content of at most 45 vol % for the total content of unagglomerated abrasive particles, at most 40 vol %, at most 35 vol %, at most 30 vol %, at most 25 vol %, at most 23 vol %, at most 22 vol %, at most 20 vol %, at most 18 vol %, at most 15 vol %, at most 13 vol %, at most 10 vol %, at most 9 vol %, or at most 5 vol % relative to the total content of unagglomerated abrasive particles.

Embodiment 73. The abrasive article of Embodiment 72, wherein the third abrasive particles may be in the content of at least 0.5 vol % for the total content of the unagglomerated abrasive particles, at least 1 vol %, at least 2 vol %, at least 3 vol %, at least 5 vol %, at least 7 vol %, at least 10 vol %, or at least 12 vol % for the total content of the unagglomerated abrasive particles.

Embodiment 74. The abrasive article of any one of Embodiments 1 to 73, wherein the body comprises porosity comprising a type of porosity selected from the group consisting of closed porosity, open porosity, and a combination thereof.

Embodiment 75. The abrasive article of any one of Embodiments 1 to 74, wherein the body comprises porosity, and wherein a majority of the porosity is open porosity or wherein essentially all of the porosity is open porosity.

Embodiment 76. The abrasive article of any one of Embodiments 1 to 75, wherein the body comprises porosity having an average pore size of at most 1.9 mm, at most 1.5 mm, at most 1 mm, at most 900 microns, at most 800 microns, at most 700 microns, at most 600 microns, at most 500 microns, at most 450 microns, at most 400 microns, at most 350 microns, at most 300 microns, at most 250 microns, at most 200 microns, at most 150 microns, or at most 100 microns.

Embodiment 77. The abrasive article of any one of Embodiments 1 to 76, wherein the body comprises porosity having an average pore size of at least 1 micron, at least 5 microns, at least 8 microns, at least 10 microns, at least 14 microns, at least 16 microns, at least 25 microns, at least 50 microns, at least 100 microns, at least 150 microns, or at least 200 microns.

Embodiment 78. The abrasive article of any one of Embodiments 1 to 77, comprising a fixed abrasive including a grinding wheel.

Embodiment 79. The abrasive article of any one of Embodiments 1 to 78, wherein the abrasive article includes a gear grinding wheel.

Embodiment 80. The abrasive article of any one of Embodiments 1 to 79, wherein the body comprises a first major surface, a second major surface opposite the first major surface, and an outer peripheral surface extending between the first and second major surfaces defining an outer diameter of the body, wherein the outer peripheral surface comprises geometric features complimentary to surface features of a workpiece.

Embodiment 81. The abrasive article of any one of Embodiments 1 to 80, wherein the body comprises a first major surface, a second major surface opposite the first major surface, and an inner peripheral surface extending between the first and second major surfaces defining a central opening and an inner diameter of the body, wherein the inner peripheral surface comprises geometric features complimentary to surface features of a workpiece.

Embodiment 82. The abrasive article of any one of Embodiments 1 to 81, wherein the bond material comprises an inorganic material, wherein the bond material consists essentially of the inorganic material.

Embodiment 83. The abrasive article of any one of Embodiments 1 to 82, wherein the body comprises a content of third abrasive particles of at most 50 vol % for a total content of abrasive particles, at most 45 vol %, at most 40 vol %, at most 35 vol %, at most 30 vol %, at most 28 vol %, at most 25 vol %, at most 22 vol %, at most 20 vol %, at most 18 vol %, at most 15 vol %, at most 12 vol %, at most 10 vol %, at most 8 vol %, at most 5 vol %, or at most 3 vol % for the total content of abrasive particles.

Embodiment 84. The abrasive article of any one of Embodiments 1 to 83, wherein the body comprises a content of third abrasive particles of at least 0.5 vol % for a total content of abrasive particles, at least 1 vol %, at least 2 vol %, at least 3 vol %, at least 5 vol %, at least 7 vol %, at least 10 vol %, or at least 12 vol % for the total content of abrasive particles.

Embodiment 85. The abrasive article of any one of Embodiments 1 to 84, wherein the body includes at least 0.5 vol % of third abrasive particles for the total volume of the body, at least 1 vol %, at least 2 vol %, at least 3 vol %, at least 5 vol %, at least 7 vol %, at least 9 vol %, or at least 10 vol % for the total volume of the body.

Embodiment 86. The abrasive article of any one of Embodiments 1 to 85, wherein the body is essentially free of third abrasive particles.

Embodiment 87. The abrasive article of any one of Embodiments 1 to 86, wherein the body comprises the elongated second abrasive particles in a content of at least 10 vol % for a total volume of the body, at least 15 vol %, at least 20 vol %, at least 24 vol %, at least 26 vol %, at least 30 vol %, at least 32 vol %, at least 35 vol %, at least 38 vol %, or at least 40 vol % of the total volume of the body.

Embodiment 88. The abrasive article of any one of Embodiments 1 to 87, wherein the body comprises the elongated second abrasive particles in a content of at most 55 vol % for the total volume of the body, at most 50 vol %, at most 48 vol %, at most 45 vol %, at most 40 vol %, at most 38 vol %, at most 35 vol %, at most 32 vol %, at most 30 vol % or at most 28 vol % for the total volume of the body.

EXAMPLES

Example 1

Wheel samples were made including the bond composition included in Table 2. Even though some contents are provided in ranges, it is to be understood the contents of all the components add up to 100 wt %.

TABLE 2

| Component | Contents (wt %) |
| --- | --- |
| $SiO_2$ | 45 to 58 |
| $Al_2O_3$ | 11 to 25 |

TABLE 2-continued

| Component | Contents (wt %) |
|-----------|-----------------|
| $Fe_2O_3$ | Up to 0.5 |
| $TiO_2$ | Up to 2 |
| CaO | Up to 4 |
| MgO | Up to 7 |
| $Li_2O$ | Up to 4 |
| $Na_2O$ | 3 to 12 |
| $K_2O$ | 1 to 10 |
| $B_2O_3$ | 5 to 20 |

The contents of the abrasive particles used in forming the samples are included in Table 3. Bubble alumina was used to form the bonded abrasive body of Sample CS1 without agglomerated abrasive particles. Sample $S_2$ included representative agglomerated first abrasive particles of embodiments herein. The agglomerated first abrasive particles used in Sample $S_2$ were agglomerates of ruby fused alumina grains. The ruby fused alumina grains include approximately 1.5 wt % of chromium oxide and 98.5 wt % of alumina for the total weight of the grains. Sample $S_3$ and $S_4$ were formed by partially replacing the agglomerated ruby fused alumina grains with agglomerated white fused alumina grains, Norton®38A, that do not include chromium oxide. Norton®38A fused alumina abrasive grains are available from Saint-Gobain Abrasives in Worcester, Mass.

Agglomerated ruby fused alumina grains and agglomerated white fused alumina grains were formed including 97 wt % of abrasive grains and 3 wt % of binder materials, in the same manner, utilizing a rotary kiln operated at 1150° C. in accordance with embodiments. The binder materials included a total content of $SiO_2$ and $B_2O_3$ of 71 wt %, 14 wt % of $Al_2O_3$, less than 0.5 wt % of alkaline earth oxides, a total of 13 wt % of $Na_2O$, $K_2O$ and $Li_2O$. The binder materials had specific gravity of 2.42 g/cc and viscosity of 345 Poise at 1180° C. TQ grains represent an example of elongated, seeded sol-gel alumina abrasive grains obtained from Saint-Gobain Abrasives in Worcester, Mass. and were used in forming all the samples.

All the samples were formed using the respective mixture including abrasive grains and bond precursor materials in the same manner in accordance with embodiments. All the samples, S2 to S4 had a total of approximately 40 vol % of TQ grains and agglomerates. Wheel sample CS1 included a total content of 40 vol % of abrasive particles and P15A. All the wheel samples included approximately 10 vol % bond materials and 50 vol % porosity for the total volume of the bonded abrasive body.

TABLE 3

| Samples | Elongated grains (TQ grains) (vol %) | Agglomerated Ruby grains (vol %) | Agglomerated White alumina grains (vol %) | Unagglomerated Ruby grains (vol % | P15A (alumina bubble) |
|---------|------|------|------|------|------|
| CS1 | 14.8% | / | / | 20.0% | 5.7% |
| S2 | 14.8% | 25.3% | / | / | / |
| S3 | 14.8% | 20.0% | 5.3% | / | / |
| S4 | 14.8% | 5.3% | 20.0% | / | / |

Additional information of wheel samples CS1 and $S_2$ are provided in Table 4 below. It can be noted that wheel sample $S_2$ and CS1 had comparable MOR even though wheel Sample $S_2$ had significantly higher permeability than CS1.

TABLE 4

| Samples | CS1 | S2 |
|---------|-----|-----|
| Permeability (Darcy's number) | 23.58 | 62.26 |
| MOR (MPa) | 35.66 | 36.94 |

All the samples were tested on grinding 20CrMnTi steel for evaluation of power draw vs. MRR and profile retention. Test data is illustrated in FIG. 6. Sample S2 demonstrated improved power draw when operated at the same material removal rates (MRR) compared to Samples CS1, $S_3$, and $S_4$.

Example 3

Wheel samples S15, S16, and CS17 are formed, including agglomerated pink fused alumina grains, agglomerated ruby fused alumina grains, and agglomerated white fused alumina grains, respectively, using the same bond material described in Example 1. All of the agglomerated grains are formed in the same manner as described in Example 1. Each of wheel samples S15, S16, and CS17 includes 14.8 vol % of TQ grains, 25.2 vol % of its respective agglomerated grains, 10 vol % bond materials, and 50 vol % porosity for the total volume of the bonded wheel body. Each type of alumina grains has an average particle size of approximately 165 microns.

Table 5 includes the compositions of the different abrasive grains analyzed by inductively coupled plasma mass spectrometry (ICP). For each type of the alumina grains, the contents of the components are in wt % relative to the total weight of the grains.

TABLE 5

| | Ruby fused alumina grains (wt %) | Pink fused alumina grains (wt %) | White fused alumina grains (wt %) |
|---|------|------|------|
| $Al_2O_3$ | 97.82 | 99.31 | 99.63 |
| $Cr_2O_3$ | 1.81 | 0.28 | <0.002 |
| $TiO_2$ | 0.00 | 0.01 | 0.001 |
| $Na_2O$ | 0.27 | 0.37 | 0.334 |
| $SiO_2$ | 0.04 | <0.02 | 0.027 |

All of wheel samples S15, S16, and CS17 are tested in gear grinding operations using different material removal rates on workpieces of hardened steel, such as 20CrMnTi and AISI8620H. Wheel samples S15 and S16 are expected to have improved performance over wheel samples CS17, and wheel samples S15 are expected to have improved performance than wheel samples S16. Improved performance can include one or more of profile retention ability, material removal rate, power draw, and surface finish (i.e., Ffα).

Example 4

Additional wheel samples are formed having a total content of TQ grains and agglomerated grains of 36 vol % to 44 vol % for the total volume of the wheel body, a porosity of 36 vol % to 52 vol % for the total volume of the wheel body, and a bond content of 6 vol % to 15 vol % for the total volume of the wheel body. All of the agglomerated grains and wheel samples are formed in the same manner as described in Example 1. A vitreous bond material similar to the bond material described in Example 1 is used for all the samples (e.g., a content difference of each component is within 40% of the content noted in Example 1). The wheel samples include 8 vol % to 20 vol % of TQ grains and 20 vol % to 32 vol % of agglomerated grains for the total volume of the bonded abrasive body.

Wheel samples are formed having different contents of agglomerated ruby fused grains and white fused alumina grains, as noted in Table 6, for a given content of porosity, bond, and TQ grains. The contents of each type of agglomerated grains are relative to the total weight of the agglomerated grains.

TABLE 6

| Agglomerated ruby fused grains (wt %) | Agglomerated white fused grains (wt %) |
|---|---|
| 100 | 0 |
| 90 | 10 |
| 80 | 20 |
| 70 | 30 |
| 60 | 40 |
| 50 | 50 |
| 40 | 60 |
| 30 | 70 |
| 20 | 80 |
| 10 | 90 |
| 0 | 100 |

All the wheel samples are tested in grinding operations using the same testing conditions. With increased contents of agglomerated ruby fused alumina grains, performance is expected to improve, such as profile retention, surface finishing Ffα, power draw, and/or material removal rate.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An abrasive article, comprising a body including:
   a bond material; and
   abrasive particles contained in the bond material, wherein the abrasive particles comprise:
   agglomerated first abrasive particles, wherein the agglomerated first abrasive particles comprise chromium oxide ($Cr_2O_3$); and
   elongated second abrasive particles,
   wherein the body comprises unagglomerated abrasive particles, wherein the elongated second abrasive particles are at least 51 vol % and not greater than 95 vol % of a total content of the unagglomerated abrasive particles.

2. The abrasive article of claim 1, wherein the agglomerated first abrasive particles are in a content of at least 40 vol % and at most 75 vol % for a total volume of the abrasive particles.

3. The abrasive article of claim 1, wherein the body comprises a content of the elongated second abrasive particles, Ves (vol %), for a total volume of the body, wherein a ratio of Vaf/Ves is at least 1:2 and at most 3:1.

4. The abrasive article of claim 1, wherein the first abrasive particles comprise at least 0.3 wt % and at most 5 wt % of chromium oxide ($Cr_2O_3$) for a total weight of the first abrasive particles.

5. The abrasive article of claim 4, wherein the first abrasive particles comprise at least 1 wt % of chromium oxide ($Cr_2O_3$) for the total weight of the first abrasive particles.

6. The abrasive article of claim 1, wherein the agglomerated first abrasive particles comprise Vickers hardness (HV) of greater than 2135.

7. The abrasive article of claim 1, wherein the body comprises for a total volume of the body:
   at least 2 vol % and at most 35 vol % of the bond material; and
   a porosity of at least 35 vol % and at most 65 vol %.

8. The abrasive article of claim 7, wherein the body comprises:
   a density of at least 1.6 g/cm³ and at most 2.3 g/cm³; or
   a ratio of permeability to Modulus of Rupture of at least 0.8 and not greater than 2.5.

9. The abrasive article of claim 1, wherein the agglomerated first abrasive particles are in a content of at least 10 vol % and at most 42 vol % for the total volume of the body, wherein the first abrasive particles comprise at least 0.3 wt % of chromium oxide ($Cr_2O_3$) and at most 5 wt % for a total weight of the first abrasive particles; and wherein a porosity is in a range including at least 30 vol % and at most 85 vol % for the total volume of the body.

10. The abrasive article of claim 9, wherein the body comprises a permeability having a Darcy's number of at least 35.

11. The abrasive article of claim 9, wherein the agglomerated first abrasive particles are at least 40 vol % and at most 75 vol % relative to a total content of the abrasive particles.

12. The abrasive article of claim 9, wherein a content ratio of Vaf/Ves is at most 3:1, wherein Vaf is the content of agglomerated first abrasive particles and Ves is the content of the elongated second abrasive particles.

13. The abrasive article of claim 6, wherein the agglomerated first abrasive particles comprise at least 0.7 wt % and at most 5.0 wt % of chromium oxide for a total weight of the first abrasive particles.

14. The abrasive article of claim 9, wherein the agglomerated first abrasive particles comprise at least 90 wt % of alumina for the total weight of the first abrasive particles.

15. The abrasive article of claim 9, wherein the bond material comprises a vitreous bond material.

16. The abrasive article of claim 9, wherein the body is essentially free of closed pores.

17. The abrasive article of claim 13, comprising a fixed abrasive including a gear grinding wheel.

18. The abrasive article of claim 1, wherein the agglomerated first abrasive particles are in a content of at least 15 vol % and at most 42 vol % for the total volume of the body.

19. The abrasive article of claim 1, wherein the bond material comprises a vitreous bond material.

20. The abrasive article of claim 19, comprising a fixed abrasive including a gear grinding wheel.

* * * * *